United States Patent
Saito et al.

(10) Patent No.: US 9,957,904 B2
(45) Date of Patent: May 1, 2018

(54) CONTROL APPARATUS FOR CONTROLLING FUEL INJECTION TIMING AND VARIABLE VALVE TIMING IN COMPRESSION SELF-IGNITION INTERNAL COMBUSTION ENGINE

(71) Applicant: Mitsubishi Electric Corporation, Chiyoda-ku, Tokyo (JP)

(72) Inventors: Toshikatsu Saito, Chiyoda-ku (JP); Yuhei Matsushima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 302 days.

(21) Appl. No.: 14/243,577

(22) Filed: Apr. 2, 2014

(65) Prior Publication Data
US 2015/0114340 A1 Apr. 30, 2015

(30) Foreign Application Priority Data
Oct. 31, 2013 (JP) ................................ 2013-226156

(51) Int. Cl.
*F02D 41/40* (2006.01)
*F02D 37/00* (2006.01)
(Continued)

(52) U.S. Cl.
CPC ......... *F02D 37/00* (2013.01); *F02D 13/0207* (2013.01); *F02D 13/0265* (2013.01);
(Continued)

(58) Field of Classification Search
CPC ............ F02D 41/401; F02D 2041/001; F02D 2200/021; F02D 1/16; F02D 13/0265; F02D 13/0261
(Continued)

(56) References Cited

U.S. PATENT DOCUMENTS 6,994,072 B2 * 2/2006 Kuo .................... F02D 13/0207
123/295
7,669,578 B2 * 3/2010 Yamashita .............. F02B 17/00
123/295
(Continued)

FOREIGN PATENT DOCUMENTS

JP 2004-308558 A 11/2004
JP 4016568 B2 12/2007
JP 2009085198 A * 4/2009

*Primary Examiner* — Erick Solis
*Assistant Examiner* — Robert Werner
(74) *Attorney, Agent, or Firm* — Sughrue Mion, PLLC; Richard C. Turner

(57) ABSTRACT

When the starting timing of a negative valve overlapping (NVO) period exists at the delayed-angle side of the starting timing of a first NVO period, fuel injection into a cylinder is not started; when the starting timing of an NVO period exists between the starting timing of the first NVO period and the starting timing of the second NVO period, fuel injection into the cylinder is started at a given timing that includes the exhaust top dead center; when the starting timing of an NVO period exists between the starting timing of the second NVO period and the starting timing of the third NVO period, fuel injection into the cylinder is started at a given timing that does not include the exhaust top dead center, and that exists at both the advanced-angle and delayed-angle sides of the exhaust top dead center.

16 Claims, 10 Drawing Sheets

(51) Int. Cl.
    *F02D 13/02* (2006.01)
    *F02D 41/30* (2006.01)
    *F02D 35/02* (2006.01)
    *F02D 41/00* (2006.01)

(52) U.S. Cl.
    CPC ......... *F02D 35/023* (2013.01); *F02D 35/026* (2013.01); *F02D 41/3035* (2013.01); *F02D 41/401* (2013.01); *F02D 2041/001* (2013.01); *Y02T 10/18* (2013.01); *Y02T 10/44* (2013.01)

(58) Field of Classification Search
    USPC ...... 701/105, 112; 123/90.11, 90.15, 568.14, 123/295
    See application file for complete search history.

(56) References Cited

U.S. PATENT DOCUMENTS

| | | | |
|---|---|---|---|
| 8,417,437 B2* | 4/2013 | Yamashita | .......... F02D 13/0207 123/299 |
| 2001/0027783 A1 | 10/2001 | Hiraya et al. | |
| 2013/0090838 A1* | 4/2013 | Jade | ................... F02D 41/2451 701/104 |

* cited by examiner

CONTROL APPARATUS FOR CONTROLLING FUEL INJECTION TIMING AND VARIABLE VALVE TIMING IN COMPRESSION SELF-IGNITION INTERNAL COMBUSTION ENGINE

BACKGROUND OF THE INVENTION

Field of the Invention

The present invention relates to an internal combustion engine control apparatus and particularly to a control apparatus for a compression self-ignition internal combustion engine.

Field of the Invention

To date, there has been known a compression self-ignition internal combustion engine in which in comparison with an ordinary spark-ignition internal combustion engine, the compression ratio is raised so that a fuel-air mixture is ignited by itself through compression. The compression ratio of a compression self-ignition internal combustion engine is set to be higher than that of a spark-ignition internal combustion engine but lower than that of a diesel engine. A compression self-ignition internal combustion engine has an advantage that because its combustion mode is different from that of a diesel engine, the combustion temperature is relatively low and hence NOx footprint is reduced.

A compression self-ignition internal combustion engine utilizes exhaust gas heat in order to secure ignition of a fuel-air mixture; as a method of adopting the internal EGR, which is one of the methods of utilizing exhaust gas heat, a method is known in which in a period from the exhaust stroke to the intake stroke, there is provided a negative valve overlapping period (hereinafter, referred to as an "NVO period") during which both the exhaust valve and the intake valve are closed. In addition, a method is known in which there is provided a fuel injection valve that can directly inject a fuel into a cylinder, in which the quality of the fuel is improved because fuel injection is implemented during an NVO period so that the fuel is exposed to a high temperature, and in which the ignition performance of a low-ignition-performance gasoline fuel can be raised (e.g., refer to Patent Documents 1 and 2).

Patent Document 1 discloses that because fuel injection during the opening period of an exhaust valve makes the fuel injected under the condition that the piston position is relatively low and the in-cylinder pressure is approximately the same as the atmospheric pressure, the quality of the injected fuel can readily be homogenized and is improved approximately from the starting timing of the NVO period.

Patent Document 2 discloses that corresponding to a polytropic change, the in-cylinder pressure and the in-cylinder temperature are anticipated based on the in-cylinder pressure and the in-cylinder temperature at the starting timing of an NVO period and the NVO period is adjusted in such a way that the anticipated in-cylinder pressure and in-cylinder temperature at the exhaust top dead center do not fall out of an appropriate range, so that an excessively prolonged NVO period is prevented from increasing the cooling loss and deteriorating the gasoline mileage.

PRIOR ART REFERENCE

Patent Document

[Patent Document 1] Japanese Patent Application Laid-Open No. 2004-308558

[Patent Document 2] Japanese Patent No. 4016568

However, in the foregoing conventional technologies, it is not taken into consideration that even when the NVO period is the same, the change in the in-cylinder temperature differs depending on the starting timing of fuel injection and hence the fluctuation in the combustion or the output, combustion noise, and the pump loss vary. The change in the combustion or the output is given by (the standard deviation of net illustrated average effective pressure÷the average value× 100%) in predetermined cycles (hereinafter, referred to as a "COVn"); the COVn becomes high when due to occurrence of extinction or the like, the change in the inter-cycle combustion or the output increases. It is known that the combustion noise has a correlation, for example, with the maximum value of the pressure changing rate within a constant crank angle period (hereinafter, referred to as "dP/dθmax"); when the dP/dθmax increases, the combustion noise becomes larger, and the engine may be broken in some cases.

SUMMARY OF THE INVENTION

The present invention has been implemented in order to solve the foregoing problems in a conventional internal combustion engine control apparatus; the objective thereof is to provide an internal combustion engine control apparatus that can appropriately control the starting timing of fuel injection in an NVO period.

An internal combustion engine control apparatus according to the present invention includes a variable valve mechanism that varies a negative valve overlap period in which both an exhaust valve and an intake valve are closed in an interval from an exhaust stroke to an intake stroke of an internal combustion engine, a fuel injection valve that can inject a fuel directly into a cylinder of the internal combustion engine even in the negative valve overlap period, and an electronic control unit that can control respective operations of the variable valve mechanism and the fuel injection valve; the internal combustion engine control apparatus is characterized in that in the case where when it is assumed that a load condition of the internal combustion engine is constant, a negative valve overlap period that starts from the starting timing of a first negative valve overlap period is defined as the first negative valve overlap period, a negative valve overlap period that starts from the starting timing of a second negative valve overlap period existing at an advanced-angle side of the starting timing of the first negative valve overlap period is defined as the second negative valve overlap period, and a negative valve overlap period that starts from the starting timing of a third negative valve overlap period existing at the advanced-angle side of the starting timing of the second negative valve overlap period is defined as the third negative valve overlap period, the electronic control unit controls fuel injection by means of the fuel injection valve in such a way that when the starting timing of the present negative valve overlap period exists at the delayed-angle side of the first negative valve overlap period, fuel injection into the cylinder is not started in the present negative valve overlap period, that when the starting timing of the present negative valve overlap period exists between the starting timing of the first negative valve overlap period and the starting timing of the second negative valve overlap period, fuel injection into the cylinder is started at a given timing in a first fuel injection starting period that is within the present negative valve overlap period and includes the exhaust top dead center of a piston of the internal combustion engine, and that when the starting timing of the present negative valve overlap period exists between the starting timing of the second negative valve overlap period and the starting timing of the third negative valve overlap period, fuel injection into the cylinder is started at a given timing in a second fuel injection starting period that is within the present negative valve overlap period, excludes the exhaust top dead center of the piston of the internal combustion engine, and exists at both the advanced-angle side and the delayed-angle side of the exhaust top dead center.

The internal combustion engine control apparatus according to the present invention makes it possible to prevent phenomena such as that because the COVn is too large, combustion cannot continuously and stably be implemented and that because the dP/dθmax is too large, the combustion noise may become excessively large and the engine may be broken.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

For the sake of better understanding of an internal combustion engine control apparatus according to the present invention, at first, with regard to the internal combustion engine control apparatus, there will mainly be explained the valve profiles of an intake valve and an exhaust valve and the starting timing of fuel injection in an interval in which the ordinary spark-ignition mode moves into the compression self-ignition mode after a predetermined NVO period.

Figure 1:
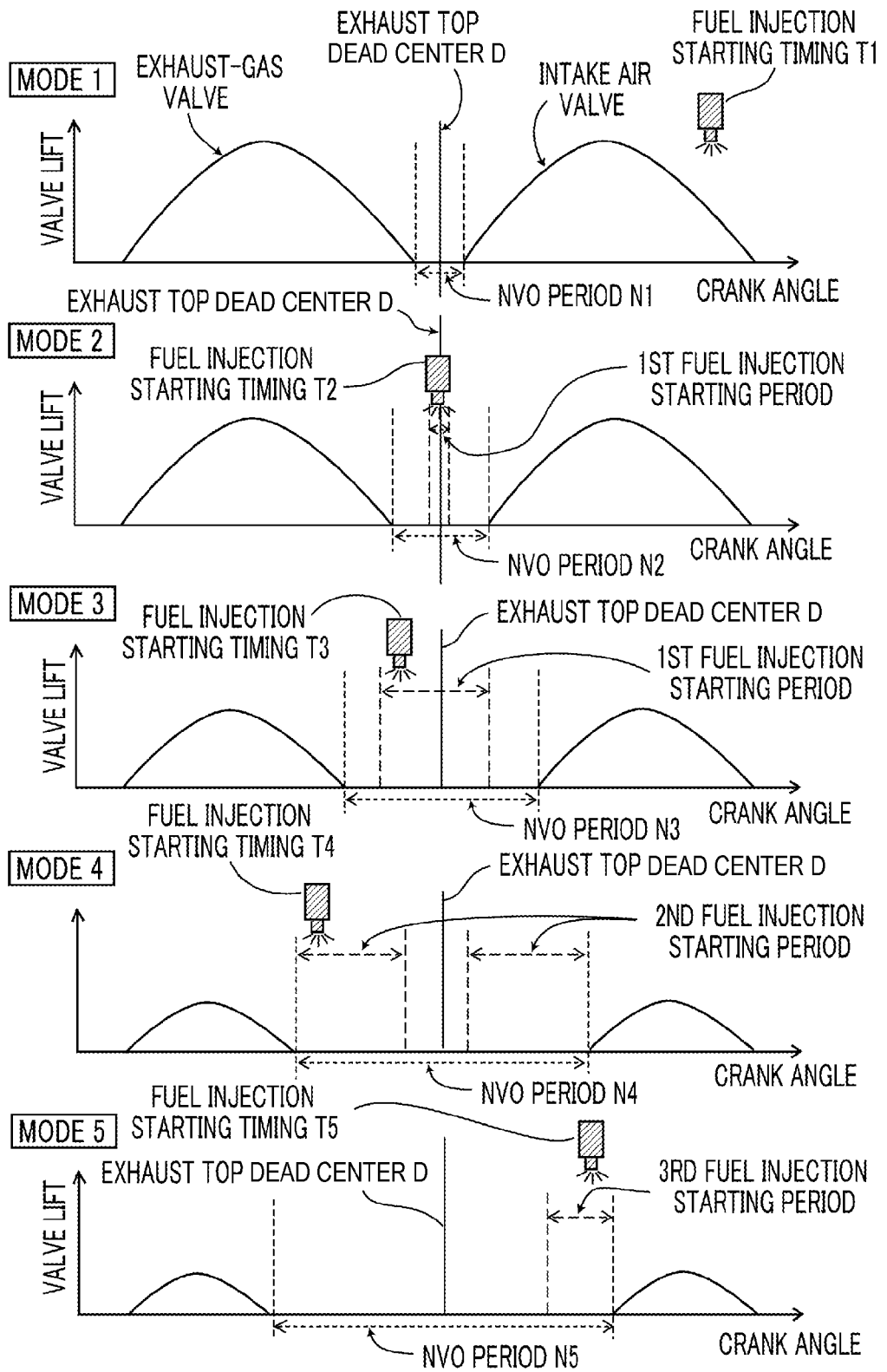
FIG. 1 is a set of explanatory graphs representing the valve profiles of an intake valve and an exhaust valve and the images of starting timings of fuel injection in different compression self-ignition modes in an internal combustion engine control apparatus according to Embodiment 1 of the present invention.

FIG. 1 is a set of explanatory graphs representing the valve profiles of an intake valve and an exhaust valve and the images of starting timings of fuel injection in different compression self-ignition modes in an internal combustion engine control apparatus according to Embodiment 1 of the present invention; the abscissa denotes the crank angle, and the ordinate denotes the valve lift amount. In FIG. 1, in the "mode 1", the starting timing of an NVO period N1, which is a negative valve overlap period in which both the exhaust valve and the intake valve are closed in an interval from the exhaust stroke to the intake stroke, is in the vicinity of the exhaust top dead center D and hence the in-cylinder volume at the starting timing of the NVO period N1 is small; therefore, the amount of internal exhaust gas recirculation (hereinafter, referred to as "internal EGR") obtained in the NVO period N1 is small, and a rise of the in-cylinder temperature, caused by the compression of the high-temperature internal EGR in an interval from the starting timing of the NVO period N1 to the exhaust top dead center D, is also small. Accordingly, even when fuel injection is implemented in the NVO period N1, the fuel-quality improvement effect is small and the adverse effect that due to fuel injection under the condition that the piston position is high, the fuel adheres to the top surface of the piston is more considerable; therefore, the COVn, which is given by (the standard deviation of net illustrated average effective pressure÷the average value×100%) in predetermined cycles, is large and hence continuous and stable combustion cannot be implemented. Therefore, in the "mode 1", fuel injection is not performed in the NVO period N1; as is the case with an ordinary spark-ignition mode, fuel injection is performed at a fuel injection starting timing T in the second half of the intake stroke in which the piston position is low and the flow of intake air into the cylinder is fast.

Next, in the "mode 2" in FIG. 1, the starting timing of the NVO period N2 is located at a more advanced crank angle than the starting timing of the "mode 1"; thus, the amount of the internal EGR obtained in the NVO period increases, and the in-cylinder temperature rises due to the compression of the high-temperature internal EGR in an interval from the starting timing of the NVO period N2 to the exhaust top dead center D. Due to the increase in the amount of the internal EGR, the COVn becomes large; however, when the ignition timing is advanced in order to reduce the COVn, dP/dθmax becomes too large. Accordingly, when fuel injection is performed in a First fuel injection starting period in the vicinity of the exhaust top dead center D, where the in-cylinder temperature is high, so that the fuel quality is improved and the ignition performance is raised, the COVn can be reduced. With regard to the fuel adhesion to the top surface of the piston caused by the fuel injection under the condition that the piston position is high, it is conceivable that due to the high temperature inside the cylinder, atomization of the fuel is facilitated and the adhesion thereof decreases.

In the "mode 3" in FIG. 1, the starting timing of the NVO period N3 is located at a more advanced crank angle than the starting timing of the "mode 2"; thus, the amount of the internal EGR obtained in the NVO period N3 further increases, and the in-cylinder temperature further rises due to the compression of the high-temperature internal EGR in an interval from the starting timing of the NVO period N3 to the exhaust top dead center D; therefore, fuel injection can be started not only in the vicinity of the exhaust top dead center D but also in the first fuel injection starting period in FIG. 1. When fuel injection is started in a period, within the NVO period N3, that is out of the first fuel injection starting period, the COVn becomes large and hence continuous and stable combustion cannot be performed.

Next, in the "mode 4" in FIG. 1, the starting timing of the NVO period N4 is located at a more advanced crank angle than the starting timing of the "mode 3"; thus, the amount of the internal EGR obtained in the NVO period N4 further increases, and the in-cylinder temperature further rises due to the compression of the high-temperature internal EGR in an interval from the starting timing of the NVO period N4 to the exhaust top dead center D; therefore, the COVn falls into the acceptable level at whichever timing within the NVO period N4 fuel injection is performed. However, in the "mode 4", when fuel injection is started at a crank angle in the vicinity of the exhaust top dead center D, the ignition performance becomes too high and hence dP/dθmax becomes too large; thus, combustion noise may become too large and the engine may be broken. Accordingly, in the "mode 4", as represented in FIG. 1, fuel injection can be started in a second fuel injection starting period that does not include the vicinity of the exhaust top dead center D.

Next, in the "mode 5" in FIG. 1, the starting timing of the NVO period N5 is located at a more advanced crank angle than the starting timing of the "mode 4"; thus, the amount of the internal EGR obtained in the NVO period N5 further increases, and the in-cylinder temperature further rises due to the compression of the high-temperature internal EGR in an interval from the starting timing of the NVO period N5 to the exhaust top dead center D. At the time point of the "mode 4", the in-cylinder temperature in the NVO period N4 is high enough for compression self-ignition; therefore, the "mode 5" is a mode in which the NVO period N5 is excessively long, and hence dP/dθmax becomes too large even when fuel injection is started at a crank angle in the vicinity of the starting timing of the NVO period N5. Accordingly, this problem can be solved by shortening the NVO period N5; however, because several cycles are required to shorten the NVO period N5, fuel injection is started, in that several cycles, in a third fuel injection starting period represented in FIG. 1 so that dP/dθmax does not exceed the acceptable level.

As described above, it has been confirmed, through the actual-equipment test, that depending on the NVO period, the starting timing of appropriate fuel injection varies. Then, in order to investigate the contributing factor thereof, the change in the in-cylinder temperature in a NVO period has been ascertained by use of a gas state equation based on the in-cylinder pressure, at each predetermined crank angle, that has been detected by the in-cylinder pressure sensor in the actual-equipment test, the in-cylinder volume at each predetermined crank angle, and the exhaust gas temperature detected by the exhaust gas temperature sensor.

Figure 2:
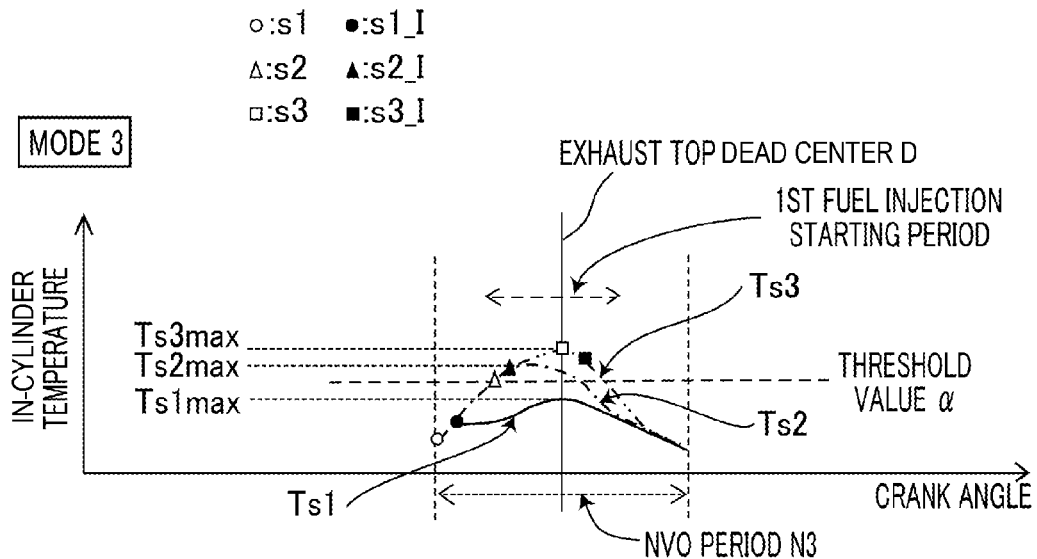
FIG. 2 is an explanatory graph for explaining the relationship between the crank angle and the in-cylinder temperature in the "mode 3" in FIG. 1.

FIG. 2 is an explanatory graph for explaining the relationship between the crank angle and the in-cylinder temperature in the "mode 3" in FIG. 1; the abscissa denotes the crank angle, and the ordinate denotes the in-cylinder temperature. In FIG. 2, Ts1 is an in-cylinder temperature changing curve at a time when fuel injection is started at a time point s1 immediately after the starting timing of the NVO period N3; Ts2 is an in-cylinder temperature changing curve at a time when fuel injection is started at a time point s2 at which the crank angle is advanced from the exhaust top dead center D; Ts3 is an in-cylinder temperature changing curve at a time when fuel injection is started at a time point s3 in the vicinity of the exhaust top dead center D. Each of the in-cylinder temperature changing curves Ts1, Ts2, and Ts3 represents a change in the in-cylinder temperature at a time when the same amount of fuel is injected; the time point s1 immediately after the starting timing of the NVO period N3 does not exist within the first fuel injection starting period in the "mode 3" in FIG. 1; the time point s2 at which the crank angle is advanced from the exhaust top dead center D and the time point s3 in the vicinity of the exhaust top dead center D exist within the first fuel injection starting period. A threshold value α will be described later.

In the case of the in-cylinder temperature changing curve Ts1, as is the case with the in-cylinder temperature changing curves Ts2 and Ts3, the in-cylinder temperature rises approximately in the shape of the polytropic change (strictly speaking, not the same as the polytropic change because of heat radiation and heat reception between the cylinder and the cylinder block) as the in-cylinder volume decreases; from a time point s1_I, the in-cylinder temperature of the in-cylinder temperature changing curve becomes lower than those of the in-cylinder temperature changing curves Ts2 and Ts3. This is because not only the in-cylinder temperature changes approximately in the shape of the polytropic change as the in-cylinder volume decreases, but also the inside of the cylinder is cooled because the fuel that has been injected at the time point s1 immediately after the starting timing of the NVO period N3 and has a considerably lower temperature than the internal EGR intermingles with the internal EGR and because of the latent heat of vaporization produced when the fuel is vaporized.

In the case of the in-cylinder temperature changing curve Ts1, the start of the foregoing cooling of the inside of the cylinder is delayed from the start of the fuel injection by a predetermined time, i.e., the interval from the time point s1 to the time point s1_I; similarly, the in-cylinder temperature changing curve Ts2 is delayed by the interval from the time point s2 to the time point s2_I; the in-cylinder temperature changing curve Ts3 is delayed by the interval from the time point s3 to the time point s3_I. Then, after the inside of the cylinder has been cooled due to fuel injection, the in-cylinder temperature rises up to the exhaust top dead center D approximately in the shape of the polytropic change as the in-cylinder volume decreases, and in the interval from the exhaust top dead center D to the ending timing of the NVO period N3, the in-cylinder temperature falls approximately in the shape of the polytropic change as the in-cylinder volume increases. Therefore, as represented in FIG. 2, the maximum value Ts1max of the in-cylinder temperature changing curve Ts1 in the interval from the starting timing s1 of fuel injection to the ending timing of the NVO period N3 is lower than any one of the maximum value Ts2max of the in-cylinder temperature changing curve Ts2 in the interval from the starting timing s2 of fuel injection to the ending timing of the NVO period N3 and the maximum value Ts3max of the in-cylinder temperature changing curve Ts3 in the interval from the starting timing s3 of fuel injection to the ending timing of the NVO period N3.

In the case of the in-cylinder temperature changing curve Ts2, as is the case with the in-cylinder temperature changing curve Ts3, the in-cylinder temperature rises till the time point s2_I approximately in the shape of the polytropic change as the in-cylinder volume decreases; then, from the time point s2_I, the in-cylinder temperature changes approximately in the shape of the polytropic change as the in-cylinder volume decreases or increases and at the same time, the inside of the cylinder is cooled due to fuel injection; then, after the inside of the cylinder has been cooled due to fuel injection, the in-cylinder temperature falls till the ending timing of the NVO period N3 approximately in the shape of the polytropic change as the in-cylinder volume increases. Accordingly, as represented in FIG. 2, the maximum value Ts2max of the in-cylinder temperature changing curve Ts2 is higher than the maximum value Ts1max of the in-cylinder temperature changing curve Ts1 but is lower than the maximum value Ts3max of the in-cylinder temperature changing curve Ts3.

In the case of the in-cylinder temperature changing curve Ts3, the in-cylinder temperature rises in the interval from the starting timing of the NVO period N3 to the exhaust top dead center D approximately in the shape of the polytropic change as the in-cylinder volume decreases; the in-cylinder temperature falls in the interval from the exhaust top dead center D to the time point s3_I approximately in the shape of the polytropic change as the in-cylinder volume increases; then, from the time point s3_I, the in-cylinder temperature changes as the in-cylinder volume increases and at the same time, the inside of the cylinder is cooled due to fuel injection; then, after the inside of the cylinder has been cooled due to fuel injection, the in-cylinder temperature falls till the ending timing of the NVO period N3 approximately in the shape of the polytropic change as the in-cylinder volume increases. Accordingly, as represented in FIG. 2, the maximum value Ts3max of the in-cylinder temperature changing curve Ts3 is lower than any one of the maximum value Ts1max of the in-cylinder temperature changing curve Ts1 and the maximum value Ts2max of the in-cylinder temperature changing curve Ts2.

When fuel injection is started at the time point s1 immediately after the starting timing of the NVO period N3, the COVn becomes large and hence continuous and stable combustion cannot be performed; however, in contrast, when fuel injection is started at the time point s2 or s3 in the first fuel injection starting period, the COVn becomes small and an acceptable level, and hence continuous and stable combustion can be performed. This is because as explained with reference to FIG. 2, the maximum value of the in-cylinder temperature in an interval from the starting timing of fuel injection to the ending timing of the NVO period varies depending on the starting timing of the fuel injection. In other words, in order to make the COVn to be an acceptable level, it is required that the maximum value of the in-cylinder temperature in an interval from the starting timing of fuel injection to the ending timing of the NVO period is the same as or larger than the predetermined threshold value α; the first fuel injection starting period is a fuel-injection starting timing period within which the maximum value of the in-cylinder temperature in an interval from the starting timing of fuel injection to the ending timing of the NVO period is the same as or larger than the predetermined threshold value α.

Figure 3:
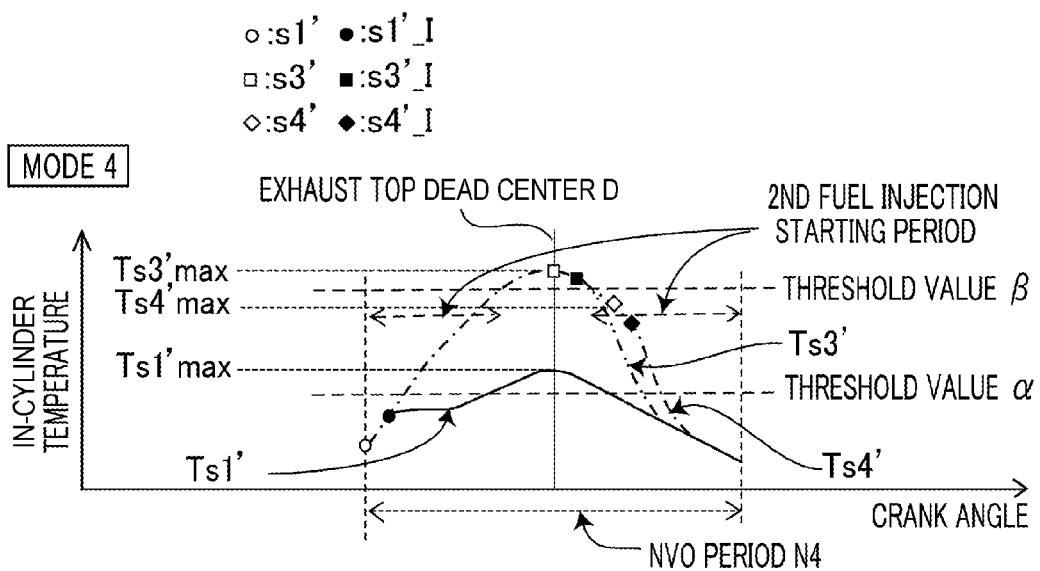
FIG. 3 is an explanatory graph for explaining the relationship between the crank angle and the in-cylinder temperature in the "mode 4" in FIG. 1.

FIG. 3 is an explanatory graph for explaining the relationship between the crank angle and the in-cylinder temperature in the "mode 4" in FIG. 1; the abscissa denotes the crank angle, and the ordinate denotes the in-cylinder temperature. In FIG. 3, Ts1' is an in-cylinder temperature changing curve at a time when fuel injection is started at a time point s1' immediately after the starting timing of the NVO period; Ts3' is an in-cylinder temperature changing curve at a time when fuel injection is started at a time point s3' in the vicinity of the exhaust top dead center D; Ts4' is an in-cylinder temperature changing curve at a time when fuel injection is started at a time point s4' at which the crank angle is delayed from the exhaust top dead center. Ts1'max, Ts3'max, and Ts4'max are the respective in-cylinder temperature maximum values of the in-cylinder temperature changing curves Ts1', Ts3', and Ts4' in an interval from the starting timing of fuel injection to the ending timing of the NVO period N4.

Each of the in-cylinder temperature changing curves Ts1', Ts3', and Ts4' represents a change in the in-cylinder temperature at a time when the same amount of fuel is injected. Unlike the "mode 3", the time point s3' does not exist within a fuel injection starting period, i.e., does not exist within the second fuel injection starting period; in contrast, the time points s1' and s4' exist within the second fuel injection starting period. The threshold value α is the same as that in FIG. 2; a threshold value β will be described later.

In the case of the in-cylinder temperature changing curve Ts1', as is the case with the in-cylinder temperature changing curve Ts3' or Ts4', the in-cylinder temperature rises till a time point s1'_I approximately in the shape of the polytropic change as the in-cylinder volume decreases; then, from the time point s1'_I, the in-cylinder temperature changes approximately in the shape of the polytropic change as the in-cylinder volume decreases and at the same time, the inside of the cylinder is cooled due to fuel injection; then, after the inside of the cylinder has been cooled due to fuel injection, the in-cylinder temperature rises till the exhaust top dead center D approximately in the shape of the polytropic change as the in-cylinder volume decreases; the in-cylinder temperature falls in the interval from the exhaust top dead center D to the ending timing of the NVO period N4 approximately in the shape of the polytropic change as the in-cylinder volume increases. Because the in-cylinder maximum temperature value Ts1'max of the in-cylinder temperature changing curve Ts1' becomes the same as or larger than the threshold value α, the COVn is small and an acceptable level.

In the case of the in-cylinder temperature changing curve Ts3', as is the case with the in-cylinder temperature changing curve Ts4', the in-cylinder temperature rises till a time point s3'_I approximately in the shape of the polytropic change as the in-cylinder volume decreases; then, from the time point s3'_I, the in-cylinder temperature changes approximately in the shape of the polytropic change as the in-cylinder volume increases and at the same time, the inside of the cylinder is cooled due to fuel injection; then, after the inside of the cylinder has been cooled due to fuel injection, the in-cylinder temperature falls till the ending timing of the NVO period N4 approximately in the shape of the polytropic change as the in-cylinder volume increases. Because the in-cylinder maximum temperature value Ts3'max of the in-cylinder temperature changing curve Ts3' also becomes the same as or larger than the threshold value α, the COVn is an acceptable level; however, because as explained with reference to FIG. 1, dP/dθmax becomes too large, combustion noise may become too large and the engine may be broken.

In the case of the in-cylinder temperature changing curve Ts4', the in-cylinder temperature rises in the interval from the time point s1' immediately after the starting timing of the NVO period N4 to the exhaust top dead center D approximately in the shape of the polytropic change as the in-cylinder volume decreases; the in-cylinder temperature falls in the interval from the exhaust top dead center D to a time point s4'_I approximately in the shape of the polytropic change as the in-cylinder volume increases; then, from the time point s43'_I, the in-cylinder temperature changes approximately in the shape of the polytropic change as the in-cylinder volume increases and at the same time, the inside of the cylinder is cooled due to fuel injection; then, after the inside of the cylinder has been cooled due to fuel injection, the in-cylinder temperature falls till the ending timing of the NVO period N4 approximately in the shape of the polytropic change as the in-cylinder volume increases. Because the in-cylinder maximum temperature value Ts4'max of the in-cylinder temperature changing curve Ts4' also becomes the same as or larger than the threshold value α, the COVn is an acceptable level. In the case of the in-cylinder temperature changing curve Ts4', the in-cylinder temperature becomes maximum in the vicinity of the exhaust top dead center D, and the maximum value is approximately the same as the in-cylinder maximum temperature value Ts3'max of the in-cylinder temperature changing curve Ts3'; however, because the time point s4' is delayed from the exhaust top dead center D, the in-cylinder maximum temperature value Ts4'max is lower than the maximal value Ts3'max, as represented in FIG. 3.

The reason why dP/dθmax becomes too large when fuel injection is started at the time point s3' is also that as explained with reference to FIG. 3, the maximum value of the in-cylinder temperature changes in an interval from the starting timing of fuel injection to the ending timing of the NVO period N4. In other words, in order to make dP/dθmax to be an acceptable level, it is required that the maximum value of the in-cylinder temperature in an interval from the starting timing of fuel injection to the ending timing of the NVO period N4 is the same as or smaller than the predetermined threshold value β; the second fuel injection starting period is a fuel-injection starting timing period within which the maximum value of the in-cylinder temperature in an interval from the starting timing of fuel injection to the ending timing of the NVO period N4 is the same as or larger than the threshold value α but smaller than the threshold value β.

As described above, depending on the starting timing of fuel injection, even when being within the same NVO period, the COVn may become large and hence continuous and stable combustion cannot be performed, or dP/dθmax becomes too large and hence combustion noise may become excessively large and the engine may be broken; therefore, it is important that fuel injection is started within the first fuel injection starting period or the second fuel injection starting period.

Figure 4:
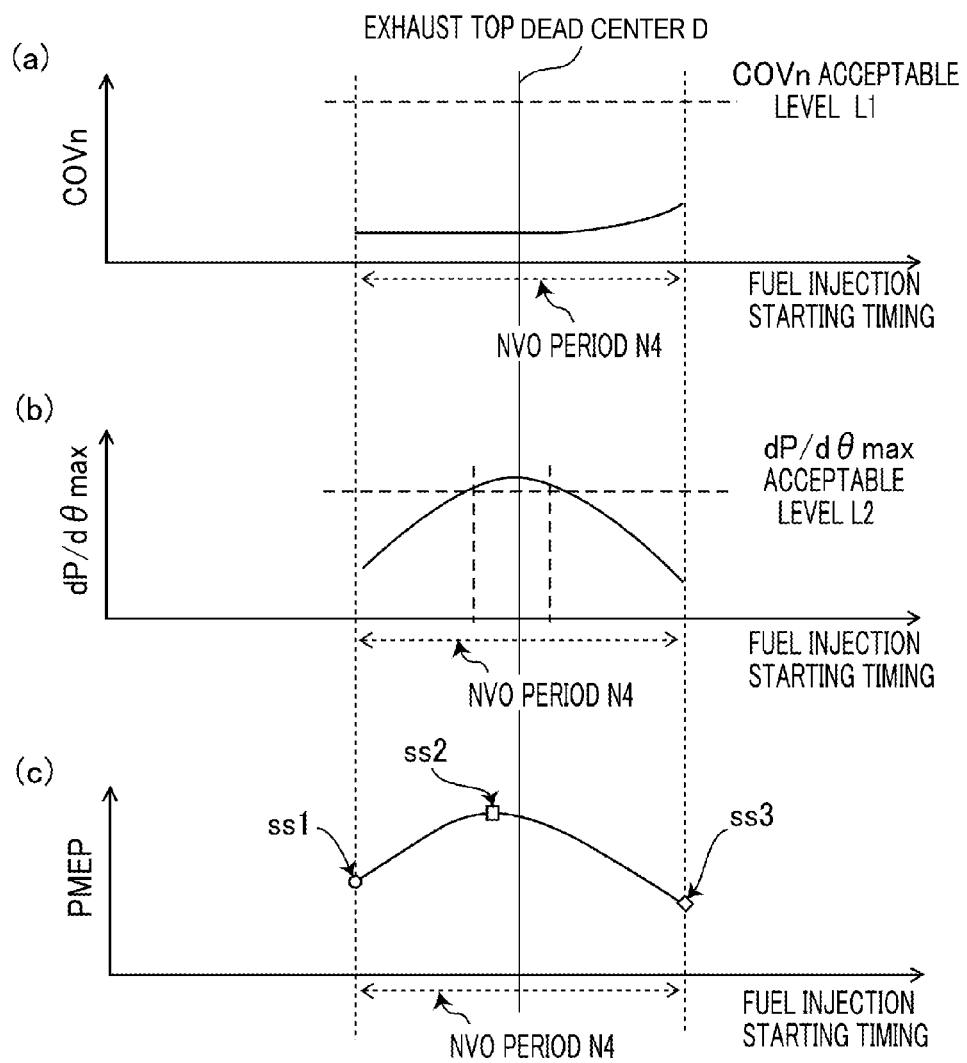
FIG. 4 is a set of explanatory graphs representing the images of COVn, dP/dθmax, and PMEP vs. the fuel injection timing in the "mode 4" in FIG. 1.

Furthermore, even when fuel injection is started within the first fuel injection starting period or the second fuel injection starting period, the difference in the in-cylinder temperature due to the difference in the starting timing of fuel injection makes the COVn or the pump loss vary within the acceptable level. FIG. 4 is a set of explanatory graphs representing the images of the COVn, dP/dθmax, and PMEP vs. the fuel injection timing in the "mode 4" in FIG. 1. Here, PMEP denotes a value to be obtained by integrating the multiplication of the in-cylinder pressure and the in-cylinder volume from the exhaust bottom dead center to the intake bottom dead center. In FIG. 4, the abscissa denotes the starting timing of fuel injection, and in FIG. 4(a), the ordinate denotes the COVn at a time when the fuel is injected at the starting timing of each fuel injection; in FIG. 4(b), the ordinate denotes dP/dθmax; in FIG. 4(c), the ordinate denotes PMEP. In FIG. 4(a), the acceptable level of the COVn is indicated by a broken line L1 (it is assumed that when the COVn is smaller than the acceptable level L1, the COVn is within the acceptable level L1); in FIG. 4(b), the acceptable level of dP/dθmax is indicated by a broken line L2 (it is assumed that when dP/dθmax is smaller than the acceptable level L2, dP/dθmax is within the acceptable level L2.

As represented in FIG. 4(a), the COVn is within the acceptable level L1 at whichever timing within the NVO period N4 fuel injection is performed; however, the COVn is approximately constant in the interval from the starting timing of the NVO period N4 to a timing that is delayed by a certain angle from the exhaust top dead center D; then, the COVn increases gradually from the exhaust top dead center D toward the ending timing of the NVO period N4. Therefore, the COVn becomes lower when fuel injection is started immediately after the starting timing of the NVO period N4 than when fuel injection is started immediately before the ending timing of the NVO period N4. This is because the in-cylinder temperature changes in an interval from the starting timing of fuel injection to the ending timing of the NVO period N4. Explaining in detail, in the case where fuel injection is started immediately after the starting timing of the NVO period N4, the in-cylinder temperature rises in the interval from a time point at which the inside of the cylinder is cooled due to the fuel injection to the exhaust top dead center approximately in the shape of the polytropic change as the in-cylinder volume decreases; therefore, the maximum value of the in-cylinder temperature in the interval from the starting timing of fuel injection to the ending timing of the NVO period N4 becomes higher when fuel injection is started immediately after the starting timing of the NVO period N4 than when the fuel injection is started immediately before the ending timing of the NVO period N4. Thus, when it is desired to decrease the COVn, it is recommendable not to start fuel injection in the vicinity of the ending timing of the NVO period N4.

In FIG. 4(b), dP/dθmax exceeds the acceptable level line L2 in the vicinity of the exhaust top dead center D. This is because the maximum value of the in-cylinder temperature becomes too high in an interval from the starting timing of fuel injection to the ending timing of the NVO period N4; the second fuel injection starting period indicated in the "mode 4" in FIG. 2 coincides with the range in FIG. 4 in which dP/dθmax is smaller than the acceptable level line L2.

In FIG. 4(c), as the starting timing of fuel injection approaches the vicinity of the exhaust top dead center D, PMEP becomes larger; as the starting timing of fuel injection approaches from the vicinity of the exhaust top dead center D to the ending timing of the NVO period N4, PMEP becomes smaller. In the case where respective fuel injections are started at a time point ss1 immediately after the starting timing of the NVO period N4, at a time point ss2 in the vicinity of the exhaust top dead center D, and the time point ss3 immediately before the ending timing of the NVO period N4, PMEP in the case of the time point ss2>PMEP in the case of the time point ss1>PMEP in the case of the time point ss3. The reason why PMEP varies depending on the starting timing of fuel injection will be explained with reference to FIG. 5.

Figure 5:
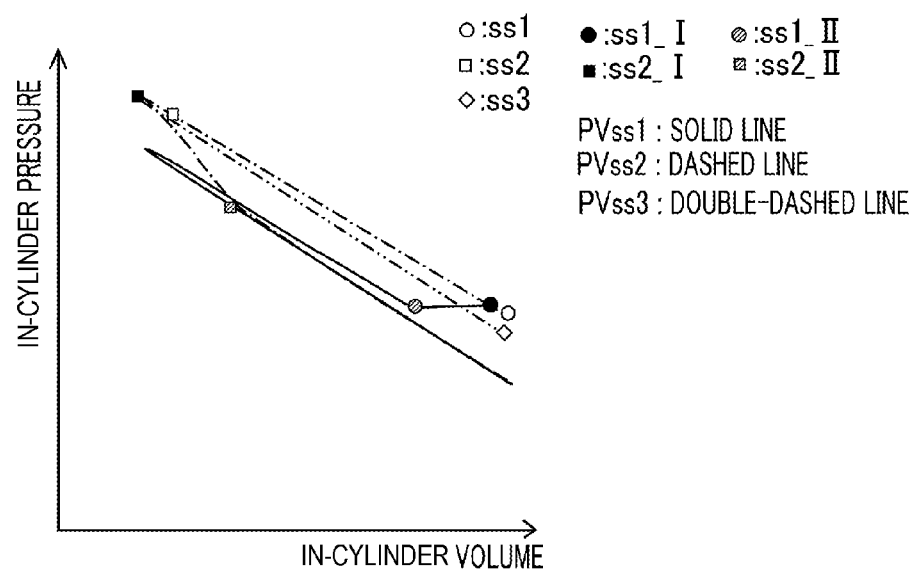
FIG. 5 is an explanatory graph representing the relationship between the in-cylinder volume and the in-cylinder pressure in an NVO period when fuel injection is started at ss1, ss2, or ss3 in FIG. 4.

FIG. 5 is an explanatory graph representing the relationship between the in-cylinder volume and the in-cylinder pressure in an NVO period when respective fuel injections are started at ss1, ss2, or ss3 in FIG. 4; this Figure is also referred to as a so-called PV curve. In FIG. 5, the abscissa denotes the in-cylinder volume, and the ordinate denotes the in-cylinder pressure. PVss1 is a PV curve at a time when the fuel is injected at the time point ss1 in FIG. 4; PVss2 is a PV curve at a time when the fuel is injected at the time point ss2 in FIG. 4; PVss3 is a PV curve at a time when the fuel is injected at the time point ss3 in FIG. 4. The mark ss1_I is the starting point of cooling caused by fuel injection at the time point ss1; the mark ss1_II is the ending point of cooling caused by the fuel injection at the time point ss1. Similarly, the mark ss2_I is the starting point of cooling caused by fuel injection at the time point ss2; the mark ss2_II is the ending point of cooling caused by the fuel injection at the time point ss2.

In FIG. 5, in the PV curve PVss1 at a time when fuel is injected at the time point ss1, the in-cylinder pressure rises from the starting timing of the NVO period N4 to the time point ss1_I approximately in the shape of the polytropic change as the in-cylinder volume decreases; from the time point ss1_I to the time point ss1_II, the in-cylinder pressure changes in such a manner that a decrease in the in-cylinder pressure caused by in-cylinder cooling due to fuel injection is added to the in-cylinder pressure that rises approximately in the shape of the polytropic change as the in-cylinder volume decreases; after the time point ss1_II, the in-cylinder pressure changes approximately in the shape of polytropic change as the in-cylinder volume decreases or increases.

In the PV curve PVss2 at a time when fuel is injected at the time point ss2, the in-cylinder pressure rises from the starting timing of the NVO period N4 to the time point ss2_I (the same timing as the exhaust top dead center) approximately in the shape of the polytropic change as the in-cylinder volume decreases; from the time point ss2_I to the time point ss2_II, the in-cylinder pressure changes in such a manner that a decrease in the in-cylinder pressure caused by in-cylinder cooling due to fuel injection is added to the in-cylinder pressure that falls approximately in the shape of the polytropic change as the in-cylinder volume increases; after the time point ss2_II, the in-cylinder pressure changes approximately in the shape of polytropic change as the in-cylinder volume increases.

In the PV curve PVss3 at a time when fuel is injected at the time point ss3, the in-cylinder pressure changes from the starting timing of the NVO period to the ending timing of the NVO period approximately in the shape of the polytropic change as the in-cylinder volume decreases or increases.

Also in the case where fuel injection is started at the time point ss3, the in-cylinder pressure falls, after the ending timing of the NVO period N4, due to in-cylinder cooling caused by the fuel injection; however, because intake air flows into the cylinder, the decrease, in the in-cylinder pressure, that is caused by in-cylinder cooling due to the fuel injection is smaller than the decrease in the in-cylinder pressure at a time when fuel is injected at the time point ss1 or ss2. For that reason, even in the same NVO period N4, the timing of the in-cylinder pressure fall caused by cooling due to fuel injection changes depending on the starting timing of the fuel injection; thus, in the case where the in-cylinder pressure fall caused by cooling due to fuel injection starts in the vicinity of the exhaust top dead center, the PMEP becomes maximum. Thus, when it is desired to decrease the PMEP, it is recommendable to start fuel injection at a timing that is as close to the starting timing or the ending timing of the NVO period N4 as possible.

As explained above with reference to FIGS. 1 through 5, even in the same NVO period, the COVn, dP/dθmax, and the pump loss change depending on the starting timing of fuel injection; thus, it is required to appropriately control the starting timing of fuel injection in the NVO period.

In Patent Document 1, fuel is injected during the exhaust valve opening period, regardless of the starting timing of the NVO period; therefore, in the foregoing "mode 1" through "mode 3", the COVn becomes large and hence the combustion becomes unstable. In Patent Document 2, control of the NVO period is performed in accordance with an in-cylinder temperature change within the NVO period; however, it is not described at which timing within the NVO period fuel injection is started, and with regard to the in-cylinder temperature change, the in-cylinder temperature fall due to fuel injection is not taken into consideration.

Embodiment 1

Figure 6:
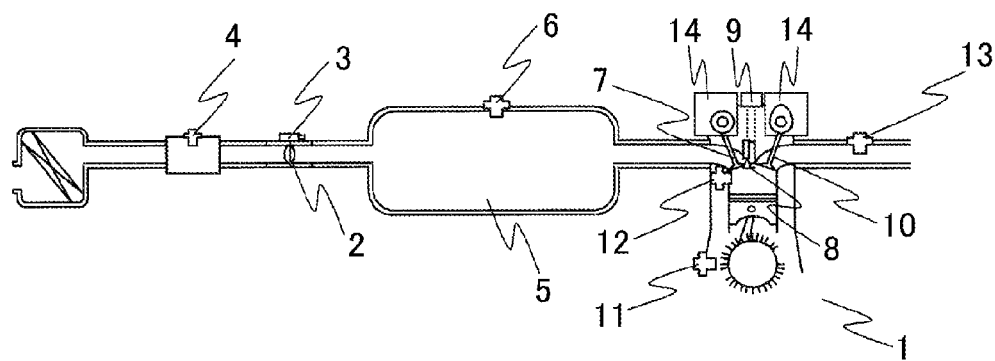
FIG. 6 is a configuration diagram schematically illustrating an internal combustion engine to which an internal combustion engine control apparatus according to Embodiment 1 of the present invention is applied.

Hereinafter, there will be explained the internal combustion engine control apparatus according to Embodiment 1 of the present invention. FIG. 6 is a configuration diagram schematically illustrating an internal combustion engine to which the internal combustion engine control apparatus according to Embodiment 1 of the present invention is applied. In FIG. 6, at the upstream side of the intake system of an engine 1, there is provided an electronically-controlled throttle valve 2 that is electrically controlled to adjust the intake air flow rate. In order to measure the opening degree of the electronically-controlled throttle valve 2, a throttle opening degree sensor 3 is provided. Instead of the electronically-controlled throttle valve 2, there may be utilized a mechanical throttle valve directly connected with an unillustrated accelerator pedal through a wire. Furthermore, at the upstream side of the electronically-controlled throttle valve 2, there is provided an air flow sensor 4 that measures the intake air flow rate; in the vicinity of the engine 1, which is situated at the downstream side of the electronically-controlled throttle valve 2, there is provided an intake manifold pressure sensor 6 that measures the inside pressure of a surge tank 5. Both the air flow sensor 4 and the intake manifold pressure sensor 6 may be provided, or only either one of those may be provided.

An intake valve 7 is provided between the intake port and the inside of the cylinder at the downstream side of the surge tank 5, and an exhaust valve 10 is provided between the inside of the cylinder and the exhaust port; the intake valve 7 and the exhaust valve 10 are equipped with respective variable valve mechanisms 14 that can control the opening/ closing timing and the lift amount. An injector 8 is provided in such a way as to be able to perform injection directly into the cylinder of the engine 1. Furthermore, the engine 1 is provided with an ignition coil 9 and an ignition plug for igniting a fuel-air mixture inside the cylinder of the engine 1, a crank angle sensor 11 for detecting the edge of a plate provided on the crankshaft in order to detect the engine rotation speed Ne and the crank angle, an in-cylinder pressure sensor 12 for detecting the in-cylinder pressure, and an A/F sensor 13 for detecting the state quantity that indicates the A/F.

Figure 7:
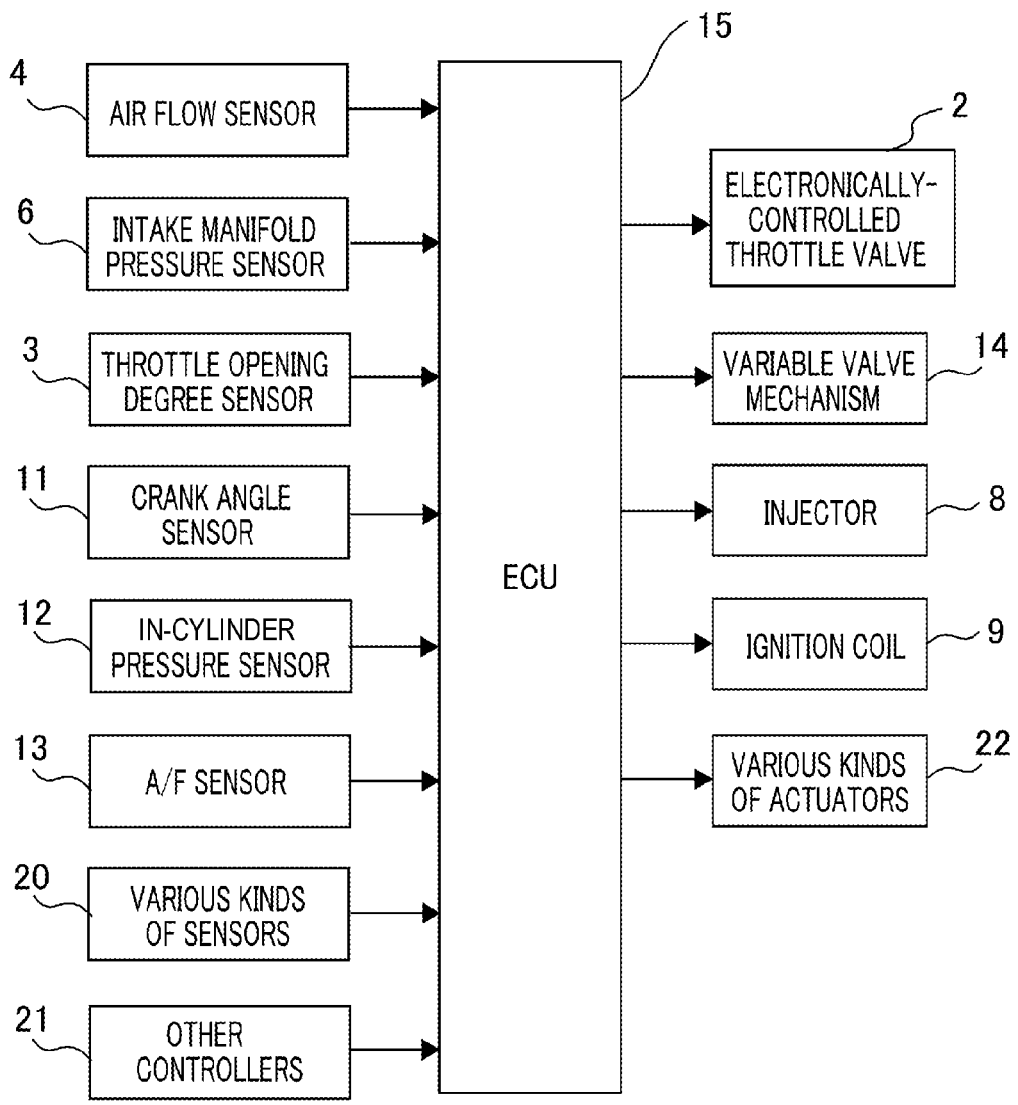
FIG. 7 is a block diagram illustrating an internal combustion engine control apparatus according to Embodiment 1 of the present invention.

FIG. 7 is a block diagram illustrating an internal combustion engine control apparatus according to Embodiment 1 of the present invention. In FIG. 7, an intake air amount measured by the air flow sensor 4, an intake manifold pressure measured by the intake manifold pressure sensor 6, an opening degree of the electronically-controlled throttle valve 2 measured by the throttle opening degree sensor 3, a pulse that is outputted from the crank angle sensor 11 and is synchronized with the edge of the plate provided on the crank shaft, in-cylinder data measured by the in-cylinder pressure sensor 12, and the state quantity that indicates the A/F measured by the A/F sensor 13 are inputted to an electronic control unit (referred to as an ECU, hereinafter) 15.

From various kinds of sensors 20 other than the foregoing sensors, measurement values are inputted to the ECU 15; furthermore, signals from other controllers (such as an automatic transmission control system, a brake control system, and a traction control system) 21 are also inputted to the ECU 15. The ECU 15 calculates a desired throttle opening degree, based on the accelerator opening degree and the engine operation status, and controls the electronically-controlled throttle valve 2. In accordance with the operation status, the ECU 15 controls the variable valve mechanism 14 for variably controlling the opening/closing timings and the lift amounts of the intake valve 7 and the exhaust valve 10, drives the injector in such a way that a desired fuel amount is injected and a desired air-fuel ratio can be achieved, and energizes the ignition coil 9 so that a desired ignition timing is achieved. In compression self-ignition combustion, described later, no spark ignition is implemented; therefore, the ignition coil 9 is not energized. Moreover, the ECU 15 calculates instruction values for various kinds of actuators other than those described above.

Next, with regard to the operation of the internal combustion engine control apparatus according to Embodiment 1 of the present invention, combustion control of an internal combustion engine will mainly be explained. The internal combustion engine control apparatus, configured as described above, according to Embodiment 1 of the present invention can perform switching between spark-ignition combustion and compression self-ignition combustion in accordance with the engine rotation speed Ne and load operation conditions.

Figure 8:
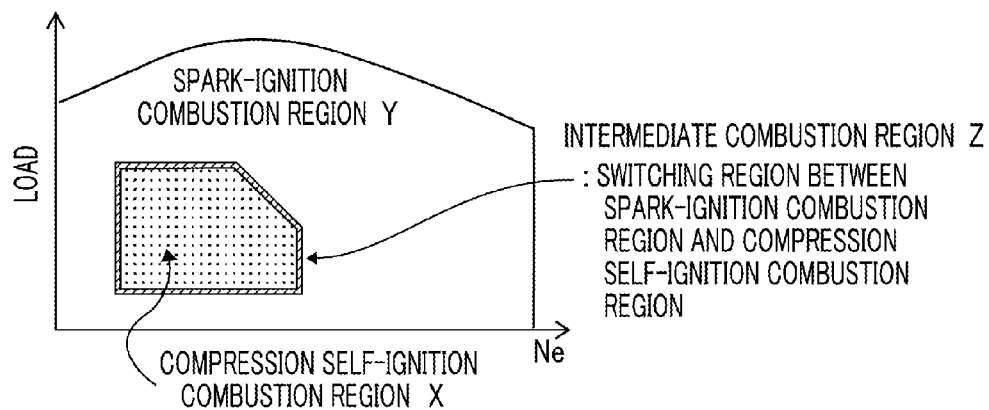
FIG. 8 is an image chart representing the operation region in which compression self-ignition combustion is performed in an internal combustion engine control apparatus according to Embodiment 1 of the present invention.

FIG. 8 is an image chart representing the operation region in which compression self-ignition combustion is performed in the internal combustion engine control apparatus according to Embodiment 1 of the present invention; the abscissa denotes the engine rotation speed Ne, and the ordinate denotes the load. That is to say, as represented in FIG. 8, compression self-ignition combustion is performed in a compression self-ignition region X, which is an operation region based on the engine rotation speed Ne and the load, and spark-ignition combustion is performed in a spark-ignition combustion region Y, which is an operation region other than the compression self-ignition region X. In an intermediate combustion region Z, which is the boundary between the compression self-ignition combustion region X and the spark-ignition combustion region Y, the compression self-ignition combustion is switched over to the spark-ignition combustion, or vice versa.

Next, there will be explained a map related to the opening/closing timings and the lift amounts of the intake valve 7 and the exhaust valve 10.

Figure 9:
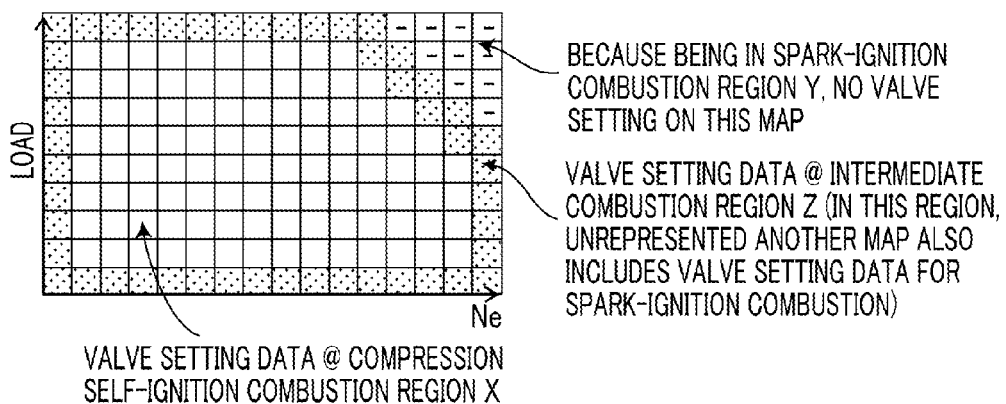
FIG. 9 is a map of valve setting data for an intake valve and an exhaust valve in compression self-ignition combustion in an internal combustion engine control apparatus according to Embodiment 1 of the present invention.

FIG. 9 is a map of valve setting data for the intake valve and the exhaust valve in compression self-ignition combustion in the internal combustion engine control apparatus according to Embodiment 1 of the present invention; the abscissa denotes the engine rotation speed Ne, and the ordinate denotes the load. The valve setting data, which is the opening/closing timings and the lift amounts of the intake valve 7 and the exhaust valve 10, preliminarily set based on an actual-equipment test or the like is stored in the map values. Accordingly, in Embodiment 1 of the present invention, the engine rotation speed Ne, the load, and the valve setting data, extracted from this map, for the intake valve 7 and the exhaust valve 10 in the compression self-ignition combustion are notified to the variable valve mechanism 14 so that the opening/closing timings and the lift amounts of the intake valve 7 and the exhaust valve 10 are controlled.

Also in the spark-ignition combustion, the opening/closing timings and the lift amounts of the intake valve 7 and the exhaust valve 10 are controlled based on unrepresented another map (the abscissa denotes Ne, and the ordinate denotes the load). Each of the map in FIG. 9 and the foregoing another map for spark ignition has valve setting data in the intermediate combustion region Z represented in FIG. 8; in the case where transition is made from the spark-ignition combustion region Y to the intermediate combustion region Z, the valve setting with the foregoing another map is switched over to the valve setting with the map in FIG. 9, and in the case where transition is made from the compression self-ignition combustion region X to the intermediate combustion region Z, the valve setting with the map in FIG. 9 is switched over to the valve setting with the foregoing another map.

In the map represented in FIG. 9, no valve setting data is included in the spark-ignition combustion region Y. The map in FIG. 9 includes valve setting data in the compression self-ignition combustion region X and valve setting data in the intermediate combustion region Z that exists on the boundary between the compression self-ignition combustion region X and the spark-ignition combustion region Y; the valve setting data in the intermediate combustion region Z is included also in the foregoing another map.

Figure 10:
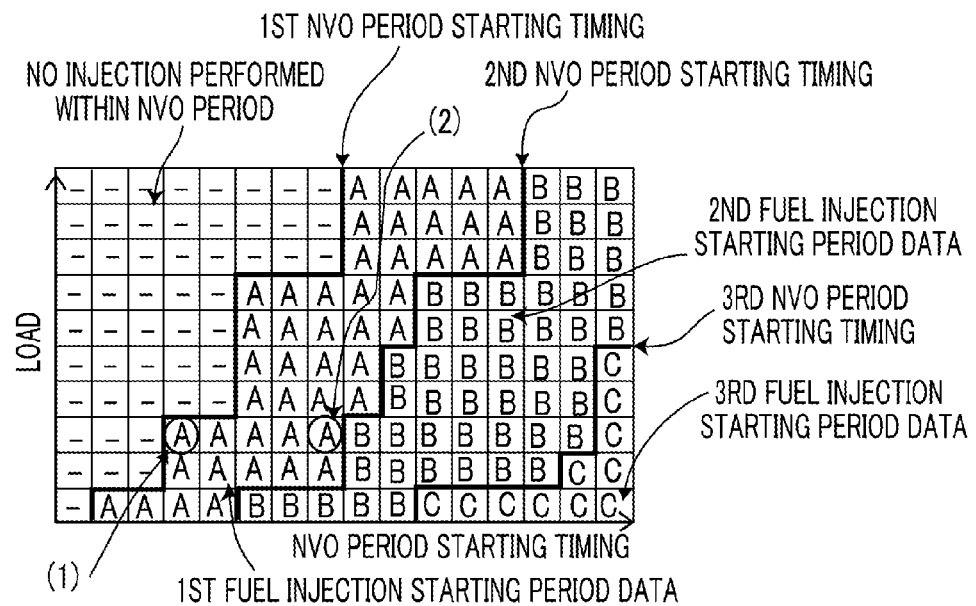
FIG. 10 is a map of fuel injection starting period data within an NVO period in an internal combustion engine control apparatus according to Embodiment 1 of the present invention.

Next, there will be explained a map related to fuel injection within an NVO period in the internal combustion engine control apparatus according to Embodiment 1 of the present invention. FIG. 10 is a map of fuel injection starting period data within an NVO period in an internal combustion engine control apparatus according to Embodiment 1 of the present invention; the abscissa denotes the starting timing of the NVO period (i.e., the closing timing of the exhaust valve 10), and the ordinate denotes the load. The map values include respective data pieces for the first, second, and third fuel injection starting periods (i.e., fuel injection starting timing data and fuel injection ending timing data) that are preliminarily set based on an actual-equipment test in such a way that the in-cylinder maximum temperature value Tsmax in an interval from the starting timing of fuel injection to the ending timing of the NVO period becomes a value between the threshold value α and the threshold value β. As described above, the second fuel injection starting period data is configured with the fuel injection starting timing data and the fuel injection ending timing data at a time when the crank angle is advanced from the exhaust top dead center D and the fuel injection starting timing data and the fuel injection ending timing data at a time when the crank angle is delayed from the exhaust top dead center D.

The first fuel injection starting period data exists in such a way as to adjoin the first NVO period starting timing; the second fuel injection starting period data exists in such a way as to adjoin the second NVO period starting timing; the third fuel injection starting period data exists in such a way as to adjoin the third NVO period starting timing. The region indicated by "-" in FIG. 10 is a region where no fuel is injected during the NVO period and no fuel injection starting period data is included.

It is assumed that the map represented in FIG. 10 is created for each engine rotation speed Ne. Accordingly, the map value is extracted based on the engine rotation speed Ne, the load, and the starting timing of the NVO period. In FIG. 10, the fuel injection starting period data is described in such a way as to be divided into A, B, and C; however, all the lengths (the start and the end) of the fuel injection starting periods are not the same, for example, in the part of A, and even in the data pieces A, the length (the start and the end) of the fuel injection starting period differs depending on the starting timing of the NVO period, the load, and the engine rotation speed Ne. For example, among the fuel injection starting period data pieces A, the fuel injection starting period of (2) is longer than that of (1).

Figure 11:
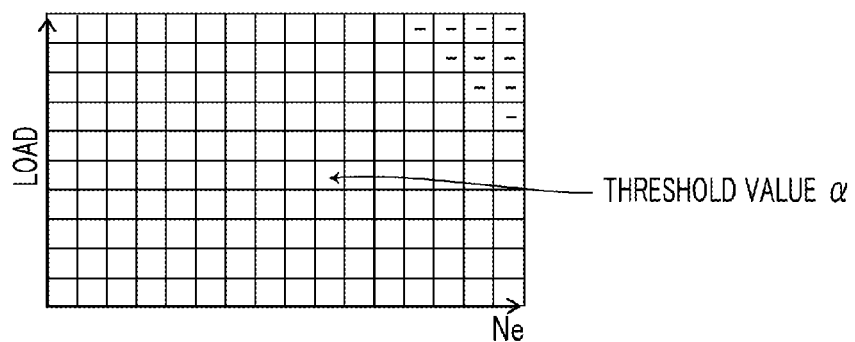
FIG. 11 is a map of the threshold value α in an internal combustion engine control apparatus according to Embodiment 1 of the present invention.
Figure 12:
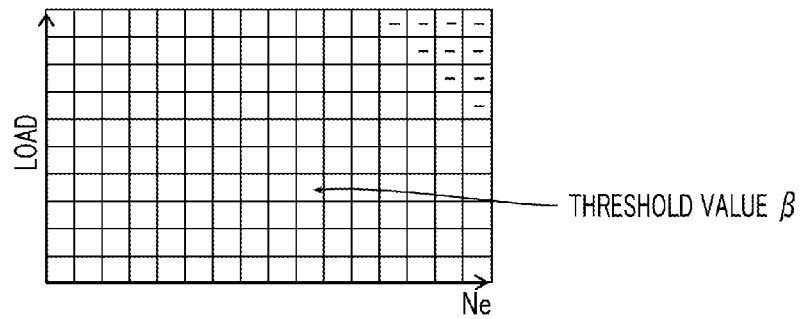
FIG. 12 is a map of the threshold value β in an internal combustion engine control apparatus according to Embodiment 1 of the present invention.

FIG. 11 is a map of the threshold value α in the internal combustion engine control apparatus according to Embodiment 1 of the present invention; the abscissa denotes the engine rotation speed Ne, and the ordinate denotes the load. The map values include the threshold values α that are preliminarily set based on an actual-equipment test or the like. FIG. 12 is a map of the threshold value β in the internal combustion engine control apparatus according to Embodiment 1 of the present invention; the abscissa denotes the engine rotation speed Ne, and the ordinate denotes the load. The map values include the threshold values β that are preliminarily set based on an actual-equipment test or the like. For each engine rotation speed Ne and the load, the threshold value α is set based on the maximum value of the in-cylinder temperature in the interval from the starting timing of fuel injection to the ending timing of the NVO period under the condition that the COVn is in the vicinity of the boundary between the acceptable level and the unacceptable level. For each engine rotation speed Ne and the load, the threshold value β is set based on the maximum value of the in-cylinder temperature in the interval from the starting timing of fuel injection to the ending timing of the NVO period under the condition that dp/dθmax is in the vicinity of the boundary between the acceptable level and the unacceptable level.

Figure 13:
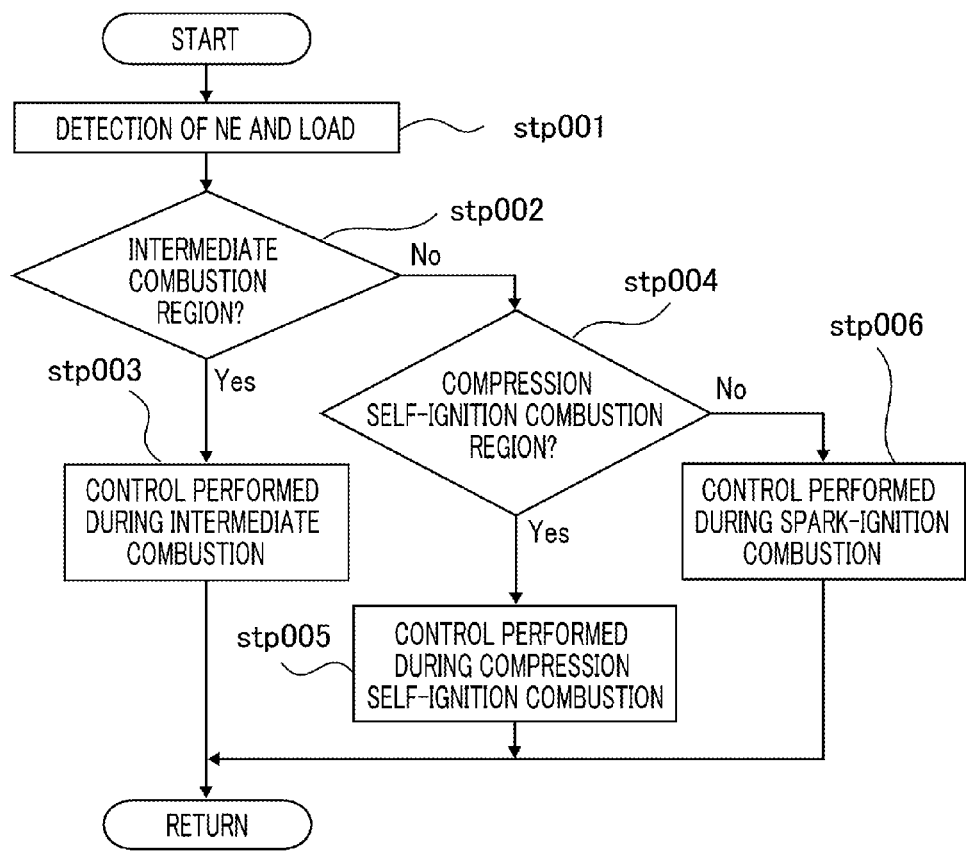
FIG. 13 is a flowchart of the combustion region determination in an internal combustion engine control apparatus according to Embodiment 1 of the present invention.

With regard to the operation of the internal combustion engine control apparatus, configured as described above, according to Embodiment 1 of the present invention, fuel injection control in the NVO period will mainly be explained. FIG. 13 is a flowchart of the combustion region determination in an internal combustion engine control apparatus according to Embodiment 1 of the present invention. In FIG. 13, the engine rotation speed Ne and the load are detected in stp001; then, stp001 is followed by stp002. In stp002, based on Ne and the load detected in stp001 and the operation region represented in FIG. 8, it is determined whether or not the present operation point is in the intermediate combustion region Z; in the case where the present operation point is in the intermediate combustion region Z (Yes), stp002 is followed by stp003; in the case where the present operation point is not in the intermediate combustion region Z (No), stp002 is followed by stp004.

In the case where stp002 is followed by stp003, intermediate combustion control, described later, is performed. In the case where stp002 is followed by stp004, it is determined whether or not the present operation point is in the compression self-ignition combustion region X; in the case where the present operation point is in the compression self-ignition combustion region X (Yes), stp004 is followed by stp005; in the case where the present operation point is not in the compression self-ignition combustion region X (No), stp004 is followed by stp006. In the case where stp004 is followed by stp005, compression self-ignition combustion control, described later, is performed; in the case where stp004 is followed by stp006, ordinary spark-ignition combustion control is performed. In the ordinary spark-ignition combustion control, no NVO period exits and hence no injection is implemented in the NVO period; thus, the explanation therefor will be omitted, here.

Figure 14:
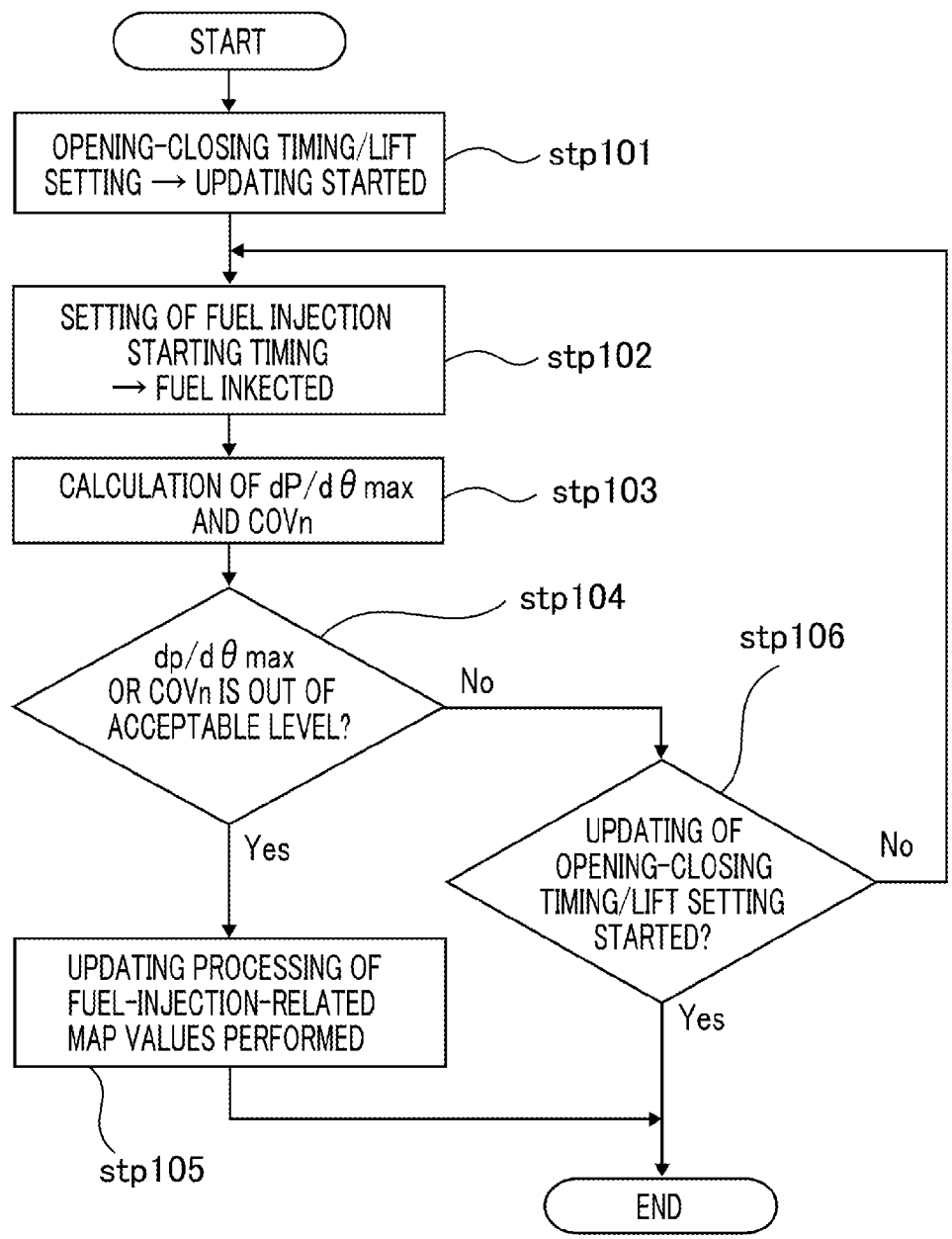
FIG. 14 is a flowchart of the fuel injection control in intermediate combustion and compression self-ignition combustion in an internal combustion engine control apparatus according to Embodiment 1 of the present invention.

Next, the fuel injection control in the intermediate combustion region Z and the compression self-ignition combustion region X will be explained. FIG. 14 is a flowchart of the fuel injection control in intermediate combustion and compression self-ignition combustion in the internal combustion engine control apparatus according to Embodiment 1 of the present invention; in the case where in foregoing FIG. 13, stp002 is followed by stp003 or stp004 is followed by stp005, the processing flow represented in FIG. 14 is implemented. In FIG. 14, at first, in stp101, the opening/closing timings and the lift amounts of the intake valve 7 and the exhaust valve 10 based on the foregoing map in FIG. 19, and then updating of the opening/closing timings and the lift amounts of the intake valve 7 and the exhaust valve 10 is started. After that, in stp102, the present NVO period starting timing is detected; then, based on the detected NVO period starting timing and the foregoing map in FIG. 10, the fuel injection starting period is extracted and set; then, at the set timing, fuel injection is performed.

In other words, in the case where the map data in FIG. 10 is "-", fuel injection is not started in the NVO period, as represented in the "mode 1" in FIG. 1, and as is the case with an ordinary spark-ignition mode, the fuel injection starting timing is set in the second half of the intake stroke in which the piston position is low and the flow of intake air into the cylinder is fast. In the first fuel injection starting period or the second fuel injection starting period in FIG. 10, the fuel injection starting timing is set in the vicinity of the starting timing of the fuel injection starting period so that the COVn and the pump loss are reduced as much as possible. In the third fuel injection starting period in FIG. 10, the fuel injection starting timing is set in the vicinity of the ending timing of the fuel injection starting period so that the pump loss is reduced as much as possible.

In stp103, from the in-cylinder pressure, for each predetermined crank angle, detected by the in-cylinder pressure sensor 12, the COVn and dp/dθmax are calculated; then, in stp104, it is determined whether or not the COVn or dp/dθmax is out of the acceptable level, and in the case where the COVn or dp/dθmax is out of the acceptable level (Yes), stp104 is followed by stp105, where updating processing of the map values related to fuel injection is implemented. In contrast, it is determined in stp104 that both the COVn and dp/dθmax are within the acceptable level (No), stp104 is followed by stp106, where it is determined whether or not updating of the opening/closing timings and the lift amounts of the intake valve 7 and the exhaust valve 10 has been completed; in the case where the updating of the opening/closing timings and the lift amounts of the intake valve and the exhaust valve 10 has been completed (Yes), the processing in FIG. 14 is ended; in the case where the updating of the opening/closing timings and the lift amounts of the intake valve 7 and the exhaust valve 10 has not been completed (No), stp102 is resumed. As described above, through the flowchart in FIG. 14, the starting timing of fuel injection within the NVO period can appropriately be controlled in accordance with the NVO period.

Figure 15:
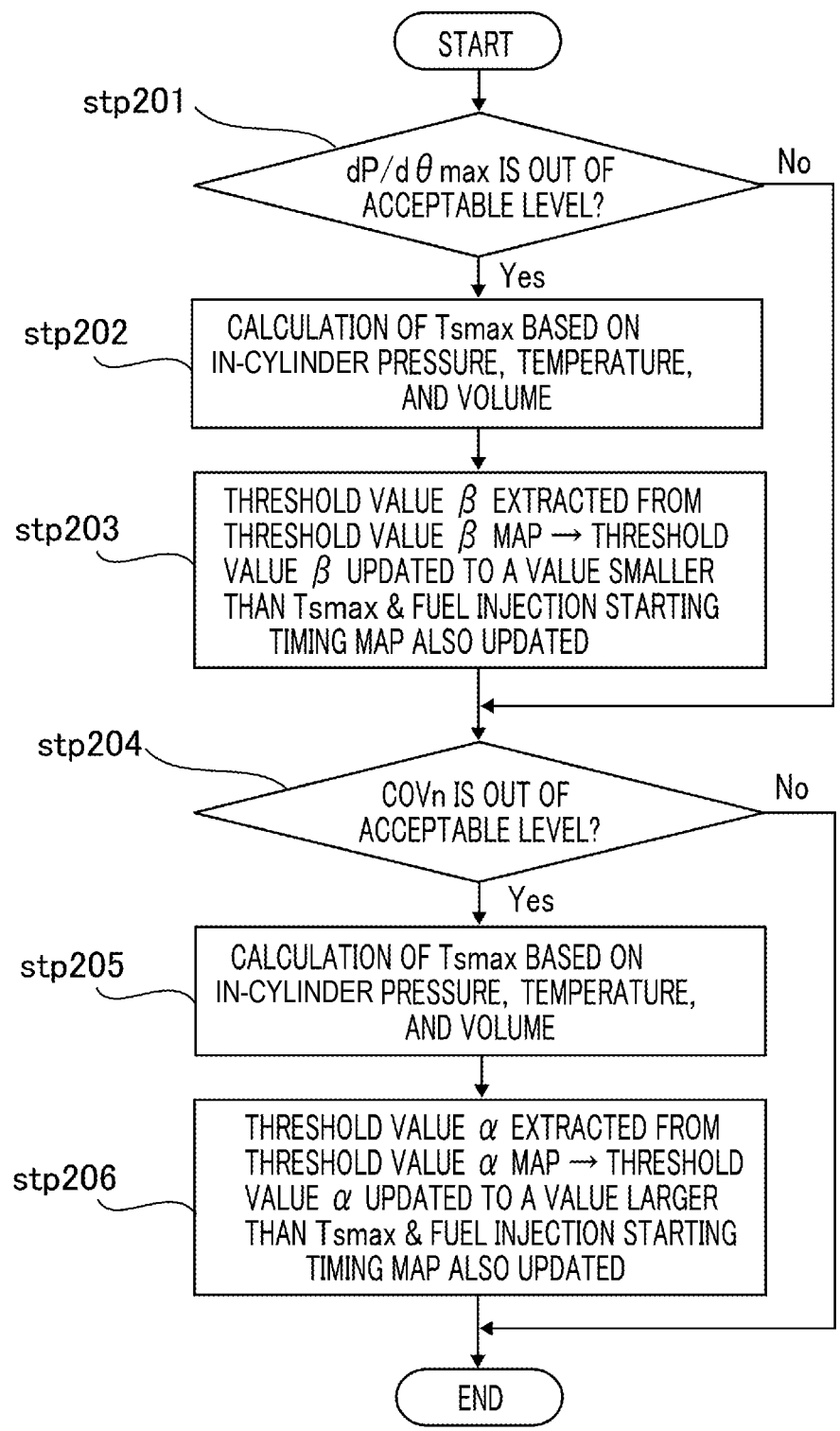
FIG. 15 is a flowchart of updating processing of map values related to fuel injection in an internal combustion engine control apparatus according to Embodiment 1 of the present invention.

Next, the updating processing of the map values related to fuel injection will be explained. FIG. 15 is a flowchart of the updating processing of the map values related to fuel injection in an internal combustion engine control apparatus according to Embodiment 1 of the present invention; in the case where in FIG. 14, stp104 is followed by stp105, the processing in the flowchart represented in FIG. 15 is implemented. In FIG. 15, it is determined whether or not dP/dθmax is out of the acceptable level; in the case where dP/dθmax is out of the acceptable level (Yes), stp201 is followed by stp202; in the case where dP/dθmax is not out of the acceptable level (No), stp201 is followed by stp204.

In the case where stp201 is followed by stp202, the in-cylinder pressure within the NVO period for each predetermined crank angle, the exhaust gas temperature in the vicinity of the starting timing of the NVO period, and the in-cylinder volume within the NVO period for each predetermined crank angle are detected; then, Tsmax is calculated through a gas state equation. Then, in stp203, the threshold value β is extracted from the threshold value β map in FIG. 12 and the fuel injection starting period is extracted from the fuel injection starting period map in FIG. 10. After that, the extracted threshold value β is changed to a value smaller than Tsmax (e.g., Tsmax−5) and is returned to the threshold value β map in FIG. 12; the fuel injection starting period is also changed in accordance with the changed threshold value β and is returned to the fuel injection starting period map in FIG. 10. Then, in stp204, it is determined whether or not the COVn is out of the acceptable level.

In the case where it is determined in stp204 that the COVn is out of the acceptable level (Yes), stp204 is followed by stp205; in the case where it is determined that the COVn is not out of the acceptable level (No), the processing in FIG. 15 is ended. In stp205, the same processing as in stp202 is implemented (the processing in stp205 is not required when it has been implemented in stp202). Next, in stp206, the threshold value α is extracted from the threshold value α map in FIG. 11 and the fuel injection starting period is extracted from the fuel injection starting period map in FIG. 10. After that, the extracted threshold value α is changed to a value larger than Tsmax (e.g., Tsmax+5) and is returned to the threshold value α map in FIG. 11; the fuel injection starting period is also changed in accordance with the changed threshold value α and is returned to the fuel injection starting period map in FIG. 10. The flowchart in FIG. 15 makes it possible to correct the map values related to fuel injection even when they do not conform to the actual combustion due to various kinds of aging deteriorations in the engine or the like.

With the foregoing configuration, the starting timing of fuel injection is controlled in accordance with the starting timing of the NVO period, so that it can be prevented that because the COVn is too large, combustion cannot continuously and stably be implemented or that because the dP/dθmax is too large, the combustion noise may become excessively large and the engine may be broken.

The internal combustion engine control apparatuses, described heretofore, according to Embodiment 1 of the present invention are the ones obtained by putting the following inventions into practice.

(1) An internal combustion engine control apparatus comprising:

a variable valve mechanism that varies a negative valve overlap period in which both an exhaust valve and an intake valve are closed in an interval from an exhaust stroke to an intake stroke of an internal combustion engine;

a fuel injection valve that can inject a fuel directly into a cylinder of the internal combustion engine even in the negative valve overlap period; and an electronic control unit that can control respective operations of the variable valve mechanism and the fuel injection valve, wherein in the case where when it is assumed that a load condition of the internal combustion engine is constant, a negative valve overlap period that starts from the starting timing of a first negative valve overlap period is defined as the first negative valve overlap period, a negative valve overlap period that starts from the starting timing of a second negative valve overlap period that exists at the advanced-angle side of the starting timing of the first negative valve overlap period is defined as the second negative valve overlap period, and a negative valve overlap period that starts from the starting timing of a third negative valve overlap period that exists at the advanced-angle side of the starting timing of the second negative valve overlap period is defined as the third negative valve overlap period, the electronic control unit controls fuel injection by means of the fuel injection valve in such a way that when the starting timing of the present negative valve overlap period exists at the delayed-angle side of the first negative valve overlap period, fuel injection into the cylinder is not started in the present negative valve overlap period, that when the starting timing of the present negative valve overlap period exists between the starting timing of the first negative valve overlap period and the starting timing of the second negative valve overlap period, fuel injection into the cylinder is started at a given timing in a first fuel injection starting period that is within the present negative valve overlap period and includes the exhaust top dead center of a piston of the internal combustion engine, and that when the starting timing of the present negative valve overlap period exists between the starting timing of the second negative valve overlap period and the starting timing of the third negative valve overlap period, fuel injection into the cylinder is started at a given timing in a second fuel injection starting period that is within the present negative valve overlap period, excludes the exhaust top dead center of the piston of the internal combustion engine, and exists at both the advanced-angle side and the delayed-angle side of the exhaust top dead center.

In this configuration, in order to improve the fuel quality by injecting the fuel after the internal EGR obtained in the NVO period is compressed in the interval from the starting timing of the NVO period to the exhaust top dead center and hence the in-cylinder temperature rises, the starting timing of the fuel injection is controlled in accordance with the starting timing of the NVO period, as described above; therefore, it can be prevented that because the COVn is too large, combustion cannot continuously and stably be implemented or that because the dP/dθmax is too large, the combustion noise may become excessively large and the engine may be broken.

(2) The internal combustion engine control apparatus according to (1), wherein in the case where fuel injection into the cylinder is started within the first fuel injection starting period, the fuel injection into the cylinder is started in the vicinity of the starting timing of the first fuel injection starting period, and wherein in the case where fuel injection into the cylinder is started within the second fuel injection starting period, the fuel injection into the cylinder is started in the vicinity of the starting timing of the second fuel injection starting period.

In this configuration, when fuel injection is started in the first fuel injection starting period or in the second fuel injection starting period, the fuel injection is started in the vicinity of each of the starting timings of the first and second fuel injection starting periods; therefore, the COVn and the pump loss can further be reduced.

(3) The internal combustion engine control apparatus according to any one of (1) and (2), wherein in the case where fuel injection into the cylinder is started within a third fuel injection starting period that exists within the third negative valve overlap period, the fuel injection into the cylinder is started in the vicinity of the ending timing of the third fuel injection starting period.

In this configuration, when fuel injection is started in the third fuel injection starting period, the fuel injection is started in the vicinity of the ending timing of the third fuel injection starting period; therefore, the pump loss can further be reduced.

(4) The internal combustion engine control apparatus according to (3), wherein in the case where the starting timing of a negative valve overlap period at a time when the first negative valve overlap period is gradually prolonged and the maximum value of the in-cylinder temperature in the first negative valve overlap period is the same as a threshold value α under the condition that fuel injection into the cylinder is not started within the first negative valve overlap period is defined as the starting timing of the first negative valve overlap period, the starting timing of a negative valve overlap period at a time when the maximum value of the in-cylinder temperature in the second negative valve overlap period is the same as a threshold value β that is higher than the threshold value α under the condition that fuel injection into the cylinder is started in the vicinity of the exhaust top dead center in the second negative valve overlap period is defined as the starting timing of the second negative valve overlap period, and the starting timing of a negative valve overlap period at a time when the maximum value of the in-cylinder temperature in the third negative valve overlap period is the same as the threshold value β under the condition that fuel injection into the cylinder is started in the vicinity of the starting timing of the third negative valve overlap period is defined as the starting timing of the third negative valve overlap period, the first fuel injection starting period is a fuel injection starting period in which when fuel injection into the cylinder is started, the maximum value of the in-cylinder temperature after the starting timing of the fuel injection is the same as or larger than the threshold value α, the second fuel injection starting period is a fuel injection starting period in which when fuel injection into the cylinder is started, the maximum value of the in-cylinder temperature in the second negative valve overlap period after the starting timing of the fuel injection is the same as or larger than the threshold value α or the maximum value of the in-cylinder temperature in the second negative valve overlap period after the starting timing of the fuel injection is smaller than the threshold value β, and the third fuel injection starting period is a fuel injection starting period in which when fuel injection into the cylinder is started, the maximum value of the in-cylinder temperature in the third negative valve overlap period after the starting timing of the fuel injection is the same as or larger than the threshold value α or the maximum value of the in-cylinder temperature in the third negative valve overlap period after the starting timing of the fuel injection is smaller than the threshold value β.

In this configuration, the first through third NVO period starting timings and the first through third fuel injection starting periods are set based on in-cylinder temperature changes, the threshold value α, and the threshold value β, so that the starting timing of fuel injection in the NVO period can appropriately be controlled.

(5) The internal combustion engine control apparatus according to (4), wherein the threshold value α is set based on the maximum value of the in-cylinder temperature in a negative valve overlap period where both the exhaust valve and the intake valve are closed after the starting timing of the fuel injection into the cylinder, under the condition that an index having a correlation with a change in fuel combustion in the cylinder or a change in the output of the internal combustion engine is in the vicinity of the boundary between the acceptable level and the unacceptable level, and wherein the threshold value β is set based on the maximum value of the in-cylinder temperature in a negative valve overlap period where both the exhaust valve and the intake valve are closed after the starting timing of the fuel injection into the cylinder, under the condition that an index having a correlation with combustion noise of the internal combustion engine is in the vicinity of the boundary between the acceptable level and the unacceptable level.

In this configuration, the acceptable level for the index having a correlation with a change in combustion or the output and the acceptable level for the index having a correlation with combustion noise can each be replaced by the maximum value of the in-cylinder temperature in the NVO period after the starting timing of fuel injection.

6. The internal combustion engine control apparatus according to any one of (1) through (5), further including a pressure detection unit that detects a pressure in the cylinder, a volume detection unit that detects a volume in the cylinder, and a temperature detection unit that detects a temperature in the cylinder at the starting timing of a negative valve overlap period where both the exhaust valve and the intake valve are closed, wherein the in-cylinder temperature in the negative valve overlap period is calculated based on a change in the in-cylinder pressure, in the negative valve overlap period, detected by the pressure detection unit, a change in the in-cylinder volume, in the negative valve overlap period, detected by the volume detection unit, and a change in the in-cylinder temperature, in the negative valve overlap period, detected by the temperature detection unit.

In this configuration, by use of various kinds of sensors, an in-cylinder pressure change in an NVO period, an in-cylinder volume change in the NVO period, and the in-cylinder temperature at the starting timing of the NVO period are detected, so that it is made possible that the in-cylinder temperature in the NVO period is calculated and the starting timing of fuel injection in the NVO period can appropriately be controlled.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine control apparatus comprising:
    a variable valve mechanism configured to vary a negative valve overlap period in which both an exhaust valve and an intake valve are closed in an interval from an exhaust stroke to an intake stroke of an internal combustion engine;
    a fuel injection valve configured to inject a fuel directly into a cylinder of the internal combustion engine even in the negative valve overlap period; and
    an electronic control unit configured to control respective operations of the variable valve mechanism and the fuel injection valve, wherein in the case where when it is assumed that a load condition of the internal combustion engine is constant, a negative valve overlap period that starts from the starting timing of a first negative valve overlap period is defined as the first negative valve overlap period, a negative valve overlap period that starts from the starting timing of a second negative valve overlap period existing at an advanced-angle side of the starting timing of the first negative valve overlap period is defined as the second negative valve overlap period, and a negative valve overlap period that starts from the starting timing of a third negative valve overlap period existing at the advanced-angle side of the starting timing of the second negative valve overlap period is defined as the third negative valve overlap period, the electronic control unit is configured to control fuel injection by means of the fuel injection valve in such a way
        that when the starting timing of the present negative valve overlap period exists at the delayed-angle side of the first negative valve overlap period, fuel injection into the cylinder is not started in the present negative valve overlap period,
        that when the starting timing of the present negative valve overlap period exists between the starting timing of the first negative valve overlap period and the starting timing of the second negative valve overlap period, fuel injection into the cylinder is started at a given timing in a first fuel injection starting period that is within the present negative valve overlap period and includes the exhaust top dead center of a piston of the internal combustion engine, and
        that when the starting timing of the present negative valve overlap period exists between the starting timing of the second negative valve overlap period and the starting timing of the third negative valve overlap period, fuel injection into the cylinder is started at a given timing in a second fuel injection starting period that is within the present negative valve overlap period, excludes the exhaust top dead center of the piston of the internal combustion engine, and exists at both the advanced-angle side and the delayed-angle side of the exhaust top dead center.

2. The internal combustion engine control apparatus according to claim 1,
    wherein the electronic control unit is further configured to control fuel injection in such a way that in the case where fuel injection into the cylinder is started within a third fuel injection starting period that exists within the third negative valve overlap period, the fuel injection into the cylinder is started in the vicinity of the ending timing of the third fuel injection starting period.

3. The internal combustion engine control apparatus according to claim 1,
    wherein the electronic control unit is further configured to control fuel injection in such a way that in the case where fuel injection into the cylinder is started within the first fuel injection starting period, the fuel injection into the cylinder is started in the vicinity of the starting timing of the first fuel injection starting period, and
    the case where fuel injection into the cylinder is started within the second fuel injection starting period, the fuel injection into the cylinder is started in the vicinity of the starting timing of the second fuel injection starting period.

4. The internal combustion engine control apparatus according to claim 3,
    wherein the electronic control unit is further configured to control fuel injection in such a way that in the case where fuel injection into the cylinder is started within a third fuel injection starting period that exists within the third negative valve overlap period, the fuel injection into the cylinder is started in the vicinity of the ending timing of the third fuel injection starting period.

5. The internal combustion engine control apparatus according to claim 2, wherein the starting timing of the first negative valve overlap period is a time at which the maximum value of the in-cylinder temperature in the first negative valve overlap period is the same as a threshold value $\alpha$ and fuel injection into the cylinder is not started, the starting timing of the second negative valve overlap period is a time at which the maximum value of the in-cylinder temperature in the second negative valve overlap period is the same as a threshold value $\beta$ that is higher than the threshold value $\alpha$ and fuel injection into the cylinder is started in the vicinity of the exhaust top dead center in the second negative valve overlap period, and the starting timing of the third negative valve overlap period is a time at which the maximum value of the in-cylinder temperature in the third negative valve overlap period is the same as the threshold value $\beta$ and fuel injection into the cylinder is started in the vicinity of the starting timing of the third negative valve overlap period,
    the first fuel injection starting period is a fuel injection starting period in which when fuel injection into the cylinder is started, the maximum value of the in-cylinder temperature after the starting timing of the fuel injection is the same as or larger than the threshold value $\alpha$,
    the second fuel injection starting period is a fuel injection starting period in which when fuel injection into the cylinder is started, the maximum value of the in-cylinder temperature in the second negative valve overlap period after the starting timing of the fuel injection is the same as or larger than the threshold value $\alpha$ or the maximum value of the in-cylinder temperature in the second negative valve overlap period after the starting timing of the fuel injection is smaller than the threshold value $\beta$, and
    the third fuel injection starting period is a fuel injection starting period in which when fuel injection into the cylinder is started, the maximum value of the in-cylinder temperature in the third negative valve overlap period after the starting timing of the fuel injection is the same as or larger than the threshold value $\alpha$ or the maximum value of the in-cylinder temperature in the third negative valve overlap period after the starting timing of the fuel injection is smaller than the threshold value β.

6. The internal combustion engine control apparatus according to claim 4, wherein the starting timing of the first negative valve overlap period is a time at which the maximum value of the in-cylinder temperature in the first negative valve overlap period is the same as a threshold value α and fuel injection into the cylinder is not started, the starting timing of the second negative valve overlap period is a time at which the maximum value of the in-cylinder temperature in the second negative valve overlap period is the same as a threshold value β that is higher than the threshold value α and fuel injection into the cylinder is started in the vicinity of the exhaust top dead center in the second negative valve overlap period, and the starting timing of the third negative valve overlap period is a time at which the maximum value of the in-cylinder temperature in the third negative valve overlap period is the same as the threshold value β and fuel injection into the cylinder is started in the vicinity of the starting timing of the third negative valve overlap period, the first fuel injection starting period is a fuel injection starting period in which when fuel injection into the cylinder is started, the maximum value of the in-cylinder temperature after the starting timing of the fuel injection is the same as or larger than the threshold value α, the second fuel injection starting period is a fuel injection starting period in which when fuel injection into the cylinder is started, the maximum value of the in-cylinder temperature in the second negative valve overlap period after the starting timing of the fuel injection is the same as or larger than the threshold value α or the maximum value of the in-cylinder temperature in the second negative valve overlap period after the starting timing of the fuel injection is smaller than the threshold value β, and the third fuel injection starting period is a fuel injection starting period in which when fuel injection into the cylinder is started, the maximum value of the in-cylinder temperature in the third negative valve overlap period after the starting timing of the fuel injection is the same as or larger than the threshold value α or the maximum value of the in-cylinder temperature in the third negative valve overlap period after the starting timing of the fuel injection is smaller than the threshold value β.

7. The internal combustion engine control apparatus according to claim 5, wherein the threshold value α is set based on the maximum value of the in-cylinder temperature in a negative valve overlap period where both the exhaust valve and the intake valve are closed after the starting timing of the fuel injection into the cylinder, under the condition that an index having a correlation with a change in fuel combustion in the cylinder or a change in the output of the internal combustion engine is in the vicinity of the boundary between the acceptable level and the unacceptable level, and wherein the threshold value β is set based on the maximum value of the in-cylinder temperature in a negative valve overlap period where both the exhaust valve and the intake valve are closed after the starting timing of the fuel injection into the cylinder, under the condition that an index having a correlation with combustion noise of the internal combustion engine is in the vicinity of the boundary between the acceptable level and the unacceptable level.

8. The internal combustion engine control apparatus according to claim 6, wherein the threshold value α is set based on the maximum value of the in-cylinder temperature in a negative valve overlap period where both the exhaust valve and the intake valve are closed after the starting timing of the fuel injection into the cylinder, under the condition that an index having a correlation with a change in fuel combustion in the cylinder or a change in the output of the internal combustion engine is in the vicinity of the boundary between the acceptable level and the unacceptable level, and wherein the threshold value β is set based on the maximum value of the in-cylinder temperature in a negative valve overlap period where both the exhaust valve and the intake valve are closed after the starting timing of the fuel injection into the cylinder, under the condition that an index having a correlation with combustion noise of the internal combustion engine is in the vicinity of the boundary between the acceptable level and the unacceptable level.

9. The internal combustion engine control apparatus according to claim 1, further including a pressure detection unit that detects a pressure in the cylinder, a volume detection unit that detects a volume in the cylinder, and a temperature detection unit that detects an exhaust gas temperature at the starting timing of a negative valve overlap period where both the exhaust valve and the intake valve are closed, wherein a change in-cylinder temperature in the negative valve overlap period is calculated using equation of state of gas based on a change in the in-cylinder pressure, in the negative valve overlap period, detected by the pressure detection unit, a change in the in-cylinder volume, in the negative valve overlap period, detected by the volume detection unit, and the exhaust gas temperature, in the negative valve overlap period, detected by the temperature detection unit.

10. The internal combustion engine control apparatus according to claim 2, further including a pressure detection unit that detects a pressure in the cylinder, a volume detection unit that detects a volume in the cylinder, and a temperature detection unit that detects an exhaust gas temperature at the starting timing of a negative valve overlap period where both the exhaust valve and the intake valve are closed, wherein change in-cylinder temperature in the negative valve overlap period is calculated based on a change in the in-cylinder pressure, in the negative valve overlap period, detected by the pressure detection unit, a change in the in-cylinder volume, in the negative valve overlap period, detected by the volume detection unit, and the exhaust gas temperature, in the negative valve overlap period, detected by the temperature detection unit.

11. The internal combustion engine control apparatus according to claim 3, further including a pressure detection unit that detects a pressure in the cylinder, a volume detection unit that detects a volume in the cylinder, and a temperature detection unit that detects an exhaust gas temperature at the starting timing of a negative valve overlap period where both the exhaust valve and the intake valve are closed, wherein the a change in-cylinder temperature in the negative valve overlap period is calculated based on a change in the in-cylinder pressure, in the negative valve overlap period, detected by the pressure detection unit, a change in the in-cylinder volume, in the negative valve overlap period, detected by the volume detection unit, and the exhaust gas temperature, in the negative valve overlap period, detected by the temperature detection unit.

12. The internal combustion engine control apparatus according to claim 4, further including a pressure detection unit that detects a pressure in the cylinder, a volume detection unit that detects a volume in the cylinder, and a temperature detection unit that detects an exhaust gas temperature at the starting timing of a negative valve overlap period where both the exhaust valve and the intake valve are closed, wherein the a change in-cylinder temperature in the negative valve overlap period is calculated based on a change in the in-cylinder pressure, in the negative valve overlap period, detected by the pressure detection unit, a change in the in-cylinder volume, in the negative valve overlap period, detected by the volume detection unit, and the exhaust gas temperature, in the negative valve overlap period, detected by the temperature detection unit.

13. The internal combustion engine control apparatus according to claim 5, further including a pressure detection unit that detects a pressure in the cylinder, a volume detection unit that detects a volume in the cylinder, and a temperature detection unit that detects an exhaust gas temperature at the starting timing of a negative valve overlap period where both the exhaust valve and the intake valve are closed, wherein a change in-cylinder temperature in the negative valve overlap period is calculated based on a change in the in-cylinder pressure, in the negative valve overlap period, detected by the pressure detection unit, a change in the in-cylinder volume, in the negative valve overlap period, detected by the volume detection unit, and the exhaust gas temperature, in the negative valve overlap period, detected by the temperature detection unit.

14. The internal combustion engine control apparatus according to claim 6, further including a pressure detection unit that detects a pressure in the cylinder, a volume detection unit that detects a volume in the cylinder, and a temperature detection unit that detects an exhaust gas temperature at the starting timing of a negative valve overlap period where both the exhaust valve and the intake valve are closed, wherein the a change in-cylinder temperature in the negative valve overlap period is calculated based on a change in the in-cylinder pressure, in the negative valve overlap period, detected by the pressure detection unit, a change in the in-cylinder volume, in the negative valve overlap period, detected by the volume detection unit, and the exhaust gas temperature, in the negative valve overlap period, detected by the temperature detection unit.

15. The internal combustion engine control apparatus according to claim 7, further including a pressure detection unit that detects a pressure in the cylinder, a volume detection unit that detects a volume in the cylinder, and a temperature detection unit that detects an exhaust gas temperature at the starting timing of a negative valve overlap period where both the exhaust valve and the intake valve are closed, wherein the a change in-cylinder temperature in the negative valve overlap period is calculated based on a change in the in-cylinder pressure, in the negative valve overlap period, detected by the pressure detection unit, a change in the in-cylinder volume, in the negative valve overlap period, detected by the volume detection unit, and the exhaust gas temperature, in the negative valve overlap period, detected by the temperature detection unit.

16. The internal combustion engine control apparatus according to claim 8, further including a pressure detection unit that detects a pressure in the cylinder, a volume detection unit that detects a volume in the cylinder, and a temperature detection unit that detects an exhaust gas temperature at the starting timing of a negative valve overlap period where both the exhaust valve and the intake valve are closed, wherein the a change in-cylinder temperature in the negative valve overlap period is calculated based on a change in the in-cylinder pressure, in the negative valve overlap period, detected by the pressure detection unit, a change in the in-cylinder volume, in the negative valve overlap period, detected by the volume detection unit, and the exhaust gas temperature, in the negative valve overlap period, detected by the temperature detection unit.

\* \* \* \* \*